(12) United States Patent
Kimura

(10) Patent No.: US 8,221,008 B2
(45) Date of Patent: Jul. 17, 2012

(54) CRADLE HAVING PANHEAD FUNCTION

(75) Inventor: Koji Kimura, Tokyo (JP)

(73) Assignee: Canon Kabushiki Kaisha (JP)

( * ) Notice: Subject to any disclaimer, the term of this patent is extended or adjusted under 35 U.S.C. 154(b) by 508 days.

(21) Appl. No.: 11/691,149

(22) Filed: Mar. 26, 2007

(65) Prior Publication Data

US 2007/0230946 A1    Oct. 4, 2007

(30) Foreign Application Priority Data

Mar. 29, 2006  (JP) ................. 2006-091378
Sep. 20, 2006  (JP) ................. 2006-254472

(51) Int. Cl.
*G03B 17/00* (2006.01)
(52) U.S. Cl. ........................................... 396/428
(58) Field of Classification Search ............... 396/419, 396/428; 348/373
See application file for complete search history.

(56) References Cited

U.S. PATENT DOCUMENTS

| 4,233,634 | A | * | 11/1980 | Adams | 348/373 |
| 4,728,839 | A | * | 3/1988 | Coughlan et al. | 310/112 |
| 5,574,522 | A | * | 11/1996 | Matsukawa | 396/411 |
| 6,124,892 | A | * | 9/2000 | Nakano | 348/373 |
| 7,503,708 | B2 | * | 3/2009 | Yang et al. | 396/427 |
| 2004/0184798 | A1 | * | 9/2004 | Dumm | 396/428 |
| 2006/0269278 | A1 | * | 11/2006 | Kenoyer et al. | 396/428 |
| 2007/0019106 | A1 | * | 1/2007 | Ibaraki | 348/373 |
| 2007/0040930 | A1 | * | 2/2007 | Lee | 348/373 |

FOREIGN PATENT DOCUMENTS

| JP | 5-056310 | A | 3/1993 |
| JP | 7-306470 | A | 11/1995 |
| JP | 2000-270316 | A | 9/2000 |
| JP | 2001-157093 | A | 6/2001 |
| JP | 2001-223919 | A | 8/2001 |
| JP | 2002-131806 | A | 5/2002 |
| JP | 3336698 | B2 | 8/2002 |
| JP | 2003-338950 | A | 11/2003 |
| JP | 2004-233540 | A | 8/2004 |
| JP | 2006-019978 | A | 1/2006 |

OTHER PUBLICATIONS

JP Action "Questioning" to corresponding JP 2006-91378, dated Sep. 13, 2011. English translation provided.

* cited by examiner

*Primary Examiner* — Rodney Fuller
(74) *Attorney, Agent, or Firm* — Rossi, Kimms & McDowell LLP

(57) ABSTRACT

A cradle having a panhead function to which an image pickup device is mounted is adapted to rotate the image pickup device in a pan direction or a tilt direction. The cradle includes a first base supported on a support base rotatably around a first rotation axis line secured relatively to the support base; a second base supported by the first base rotatably around a second rotation axis line perpendicular to the first rotation axis line and secured relatively to the first base, and adapted to support the image pickup device; a first drive portion is disposed on the support base and adapted to rotatably drive the first base via a first transmission portion; and a second drive portion is disposed on the support base and adapted to rotatably drive the second base via a second transmission portion.

6 Claims, 16 Drawing Sheets

CRADLE HAVING PANHEAD FUNCTION

BACKGROUND OF THE INVENTION

1. Field of the Invention

The present invention relates to a cradle having a panhead function that rotates an image pickup device, such as a digital camera, around two axes perpendicularly to each other, that is, in a pan direction and a tilt direction.

2. Description of the Related Art

Cradles having a panhead function have been known that rotate an image pickup device, such as a digital camera, around two axes perpendicularly to each other, that is, in a pan direction and a tilt direction. In Japanese Laid-Open Patent Publication (Kokai) No. 2002-131806, to such a cradle is mounted an image pickup device. This cradle is constituted by a motor-driven panhead including a digital camera portion, a drive portion that rotates the camera portion in a horizontal direction (a pan direction), and a drive portion that rotates the camera portion in a vertical direction (a tilt direction).

The digital camera portion is rotated by the motor-driven panhead in the pan direction and the tilt direction to perform shooting of an object image in a desired direction. Then, the digital camera portion transmits a picked-up image to an information processing device such as a personal computer (PC) as electronic data, and projects the image onto a monitor. Alternatively, the digital camera portion can transmit the picked-up image to a remote location by a communication device to store and play back the image.

The motor-driven panhead includes a pan motor and a tilt motor as drive portions, and a reduction gear mechanism (a transmission mechanism such as a gear that transmits a driving force) corresponding to each motor, for a rotation of the digital camera portion. Generally, the motor-driven panhead is configured so that any one of the motors, for example, the tilt motor is mounted to a pan base for a pan rotation, and a rotation in a pan direction causes a tilt motor body to be rotated with the pan base (see Japanese Laid-Open Patent Publication (Kokai) Nos. 2002-131806, 2001-157093, and 2000-270316).

An image pickup device having a motor-driven panhead function can be provided with a mechanism that can transmit and receive electronic data to and from an information processing device by a wireless technique to facilitate processing of the electronic data. Such a wireless image input device is expected to increase since the installation location thereof is not limited. To the cradle, a wide range of devices may be mounted such as a sound collecting microphone that is to be panned or tilted besides the digital camera.

Other cradles having a panhead function having been known that rotate a shooting direction of an image pickup device, such as a digital camera, in a pan direction and a tilt direction. (see Japanese Patent No. 3336698 and Japanese Laid-Open Patent Publication (Kokai) No. 2001-223919).

In recent years, the capacity of an image pickup device has been increasing with increasing performance of a shooting function, while a convenient cradle having a panhead function has been desired that can be easily carried and installed by reducing the sizes of a movable portion of an image pickup device and a cradle having a panhead function.

However, as described above, for the motor-driven panhead in which the tilt motor is mounted to the pan base, the tilt motor body is rotated together with the pan base in panning the camera portion. This requires a much larger space (an operation space) to be ensured for the rotation of the motor-driven panhead in the pan direction than the sizes of the tilt motor and the tilt reduction gear mechanism. Specifically, obstacles cannot be placed on rotation paths of the tilt motor and the tilt reduction gear mechanism so that rotations thereof are not prevented during the rotation in the pan direction.

Thus, the pan motor or the like has to be placed in positions other than on the rotation paths. This requires a large space for the device body to increase an installation space. If the tilt or pan reduction gear mechanism is reduced in size for reducing the operation space of the motor-driven panhead, driving torque of the motor becomes insufficient. Insufficient torque may reduce an operation speed of the pan or the tilt.

During the rotation of the pan base in the pan direction, an electric harness of the tilt motor may be entangled by the operation. Further, reliable wiring has to be performed for preventing breaking due to repeated bending of the electric harness, which makes the wiring difficult.

These problems still remain when the pan motor is mounted to a tilt base contrary to the above.

A general cradle having a panhead function includes two independent motors: a tilt motor and a pan motor for rotating an image pickup device in a pan direction and a tilt direction. In this case, the tilt motor itself is rotated in the pan direction together with the image pickup device during a rotation in the pan direction.

Thus, the pan motor has to be placed in a position other than on a rotation path so that a rotation of the tilt motor in the pan direction is not prevented. The pan motor requires torque considering the mass of the tilt motor besides the mass of the image pickup device.

This increases the sizes of a movable portion of the image pickup device and the pan motor, and makes control of the two motors complicated. Electric wiring to the tilt motor becomes also complicated, limiting an increase in speed of the rotation in the pan direction and the tilt direction.

SUMMARY OF THE INVENTION

The present invention provides a cradle having a panhead function that allows a reduction in space and facilitates electric wiring without reducing an operation speed.

The present invention also provides a cradle having a panhead function that allows a reduction in the sizes of a movable portion and a drive portion of an image pickup device, facilitates control of two drive portions and wiring to the drive portion, and attains an increase in speed of a rotation in a pan direction and a tilt direction.

According to a first aspect of the present invention, there is provided a cradle having a panhead function to which an image pickup device is mounted and adapted to rotate the image pickup device in a pan direction or a tilt direction, comprising: a support base; a first base supported on the support base rotatably around a first rotation axis line secured relatively to the support base; a second base supported by the first base rotatably around a second rotation axis line perpendicular to the first rotation axis line and secured relatively to the first base, and adapted to support the image pickup device; a first drive portion disposed on the support base and adapted to rotatably drive the first base via a first transmission portion; and a second drive portion disposed on the support base and adapted to rotatably drive the second base via a second transmission portion.

With this configuration, a reduction in space is allowed and electric wiring is facilitated without reducing an operation speed.

The second transmission portion includes a first bevel gear disposed on the second base rotatably around the first rotation axis line, and a second bevel gear disposed on the second drive portion rotatably around the second rotation axis line, and the first bevel gear and the second bevel gear engage each other.

The cradle having a panhead function can further comprise a drive control portion adapted to simultaneously control the first drive portion and the second drive portion during a pan direction-wise rotation operation or a tilt direction-wise rotation operation of the image pickup device.

With this configuration, a mounted device can be quickly displaced in a desired direction without requiring separate pan and tilt manual operations.

The drive control portion can control the first drive portion and the second drive portion so that one of the first drive portion and the second drive portion outputting a smaller driving force is used as an assist power to a driving force of the other outputting a larger driving force.

With this configuration, pan and tilt operations can be quickly and stably performed without an imbalance between loads of the drive devices.

At least one of the first drive portion and the second drive portion can be constituted by an ultrasonic wave motor.

With this configuration, the drive device constituted by the ultrasonic wave motor can be prevented from being influenced by the driving force of the other drive device without a special brake mechanism.

An output shaft of the first drive portion and an output shaft of the second drive portion can be arranged in parallel with each other.

With this configuration, the reduction in space can be facilitated.

According to a second aspect of the present invention, there is provided a cradle having a panhead function to which an image pickup device is mounted and adapted to rotate the image pickup device in a pan direction or a tilt direction, comprising: a support base; a base rotation shaft supported by the support base perpendicularly to a first rotation axis line secured relative to the support base, and rotatable around the first rotation axis line and around a second rotation axis line perpendicular to the first rotation axis line and secured relative to the support base; a first bevel gear disposed on the base rotation shaft; a support base secured to the base rotation shaft and adapted to support the image pickup device; a first rotary drive portion having a second bevel gear engaging the first bevel gear, and adapted to rotate the base rotation shaft around the second rotation axis line via the first bevel gear and the second bevel gear; and a second rotary drive portion having a third bevel gear engaging the first bevel gear, and adapted to rotate the base rotation shaft around the second rotation axis line via the first bevel gear and the third bevel gear.

A rotational direction of an output shaft of the first rotary drive portion viewed from the output shaft can be the same as a rotational direction of an output shaft of the second rotary drive portion viewed from the output shaft.

The rotational direction of the output shaft of the first rotary drive portion viewed from the output shaft can be different from the rotational direction of the output shaft of the second rotary drive portion viewed from the output shaft.

The output shaft of the first rotary drive portion and the output shaft of the second rotary drive portion can be coaxial with each other.

The output shaft of the first rotary drive portion and the output shaft of the second rotary drive portion are not coaxial with each other.

One of the first rotary drive portion and the second rotary drive portion can be operated, and the other of the first rotary drive portion and the second rotary drive portion can be prohibited from being operated.

The other of the first rotary drive portion and the second rotary drive portion can be constituted by an ultrasonic wave motor.

The cradle having a panhead function can further comprise a vertically slidable leg, wherein one of the first rotary drive portion and the second rotary drive portion is operated to slide the leg.

The support base can has a window, and a shutter member adapted to cover the window openably and closably by the sliding, and one of the first rotary drive portion and the second rotary drive portion can be rotated in a direction opposite to a direction in the sliding to slide the shutter member.

The support base can have a fixed cover member, and a movable cover member operated along with the operation of one of the first rotary drive portion and the second rotary drive portion.

According to the second aspect of the present invention, the total torque of the two drive portions can be used to rotate the image pickup device in the pan direction and the tilt direction, thereby facilitating control of the two drive portions.

The two drive devices are not rotated in the pan direction together with the image pickup device during the rotation in the pan direction, and there occurs rotation moment only on the image pickup device during the rotation in the tilt direction. This allows a reduction in the sizes of the movable portion and the two drive devices of the image pickup device, facilitates wiring to the drive portion, and attains an increase in speed of the rotation in the pan direction and the tilt direction.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail below with reference to the accompanying drawings showing preferred embodiment thereof.

Figure 1:
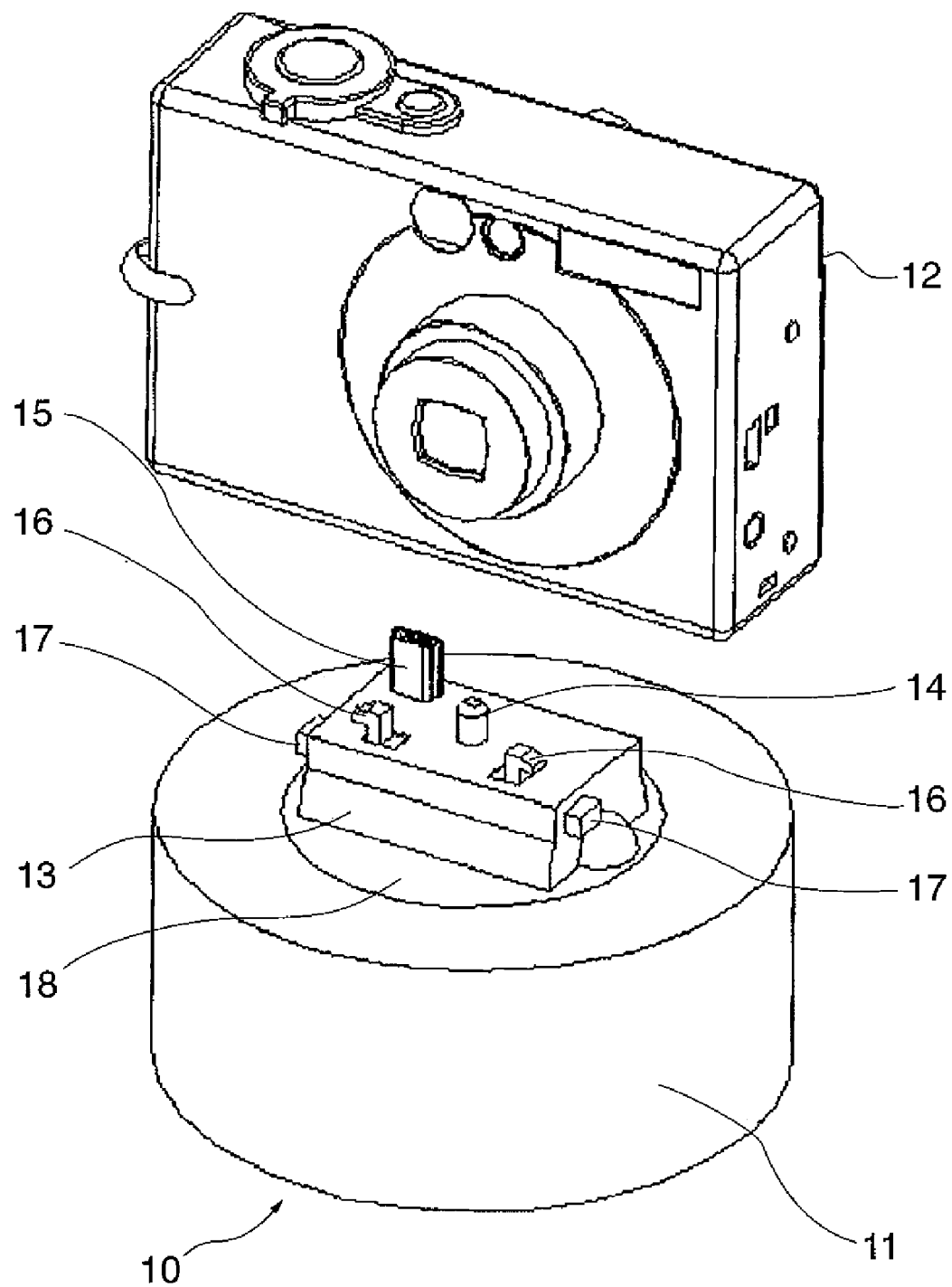
FIG. 1 is a perspective view of a cradle having a panhead function according to a first embodiment of the present invention, and a digital camera mounted to the cradle.

FIG. 1 is a perspective view of a cradle having a panhead function according to a first embodiment of the present invention, and a digital camera mounted to the cradle.

FIG. 1 shows the cradle having a panhead function (hereinafter also simply referred to as a "cradle") 10 viewed slightly from the upper right. The front side is an object side of the digital camera 12, and the right and left sides are viewed from the object side. The same applies hereinafter.

The cradle having a panhead function 10 can transmit and receive electronic data to and from an information processing device, such as a personal computer, by a wireless technique, and has a panhead function of rotationally driving the digital camera 12 mounted thereto around two axes perpendicular to each other, that is, in a pan direction and a tilt direction.

The cradle 10 includes a cylindrical support base 11, a pan base 18, and a tilt base 13. The digital camera 12 is used solely for image shooting or mountable to the cradle 10. The pan base 18 is held by the support base 11 rotatably in the pan direction, and holds the tilt base 13 rotatably in the tilt direction as described later. The tilt base 13 is rectangular on plan view, and held by the pan base 18 on an upper surface of the support base 11. On an upper surface of the tilt base 13, a positioning pin 14, a male connector 15 and a locking hook 16 are provided.

The positioning pin 14 is used to position the digital camera 12 in a horizontal direction during mounting. A hole fitting the positioning pin 14 is provided in a lower surface of the digital camera 12, though not shown. The connector 15 electrically connects the digital camera 12 and the cradle 10. A female connector corresponding to the connector 15 is provided in the lower surface of the digital camera 12, though not shown. Electronic data such as a picked-up image can be transmitted and received between the digital camera 12 and the cradle 10 via the connector 15, and electric power can be supplied from the cradle 10 to the digital camera 12.

A pair of locking hooks 16 are provided, which have hook portions directed in opposite directions. The locking hooks 16 are urged to spread apart from each other. Holes fitting the locking hooks 16 are provided in the lower surface of the digital camera 12, though not shown. For mounting and securing the digital camera 12 to the tilt base 13, the positioning pin 14 is used to position the digital camera 12 and the holes corresponding to the locking hooks 16 in the lower surface of the digital camera 12 are fitted to the locking hook 16. Since the locking hooks 16 have the hook portions and are urged to spread apart from each other, accidental removal of the mounted digital camera 12 is prevented.

Release buttons 17 are provided on opposite side surfaces of the tilt base 13 toward which the locking hooks 16 extend. The release buttons 17 are formed integrally with the locking hooks 16 close thereto and pressed down to move the locking hooks 16 close to each other. When the digital camera 12 is removed from the cradle 10, an operator presses the release buttons 17 from opposite sides to release the fitting between the locking hooks 16 and the corresponding holes in the lower surface of the digital camera 12. The two release buttons 17 are provided on the opposite sides for preventing accidental removal of the digital camera 12, and the fitting of the locking hooks 16 is released only when the operator deliberately presses the two release buttons 17.

A power cord of the cradle 10 or the like is not shown or described because it has no direct connection with the present invention.

Figure 2:
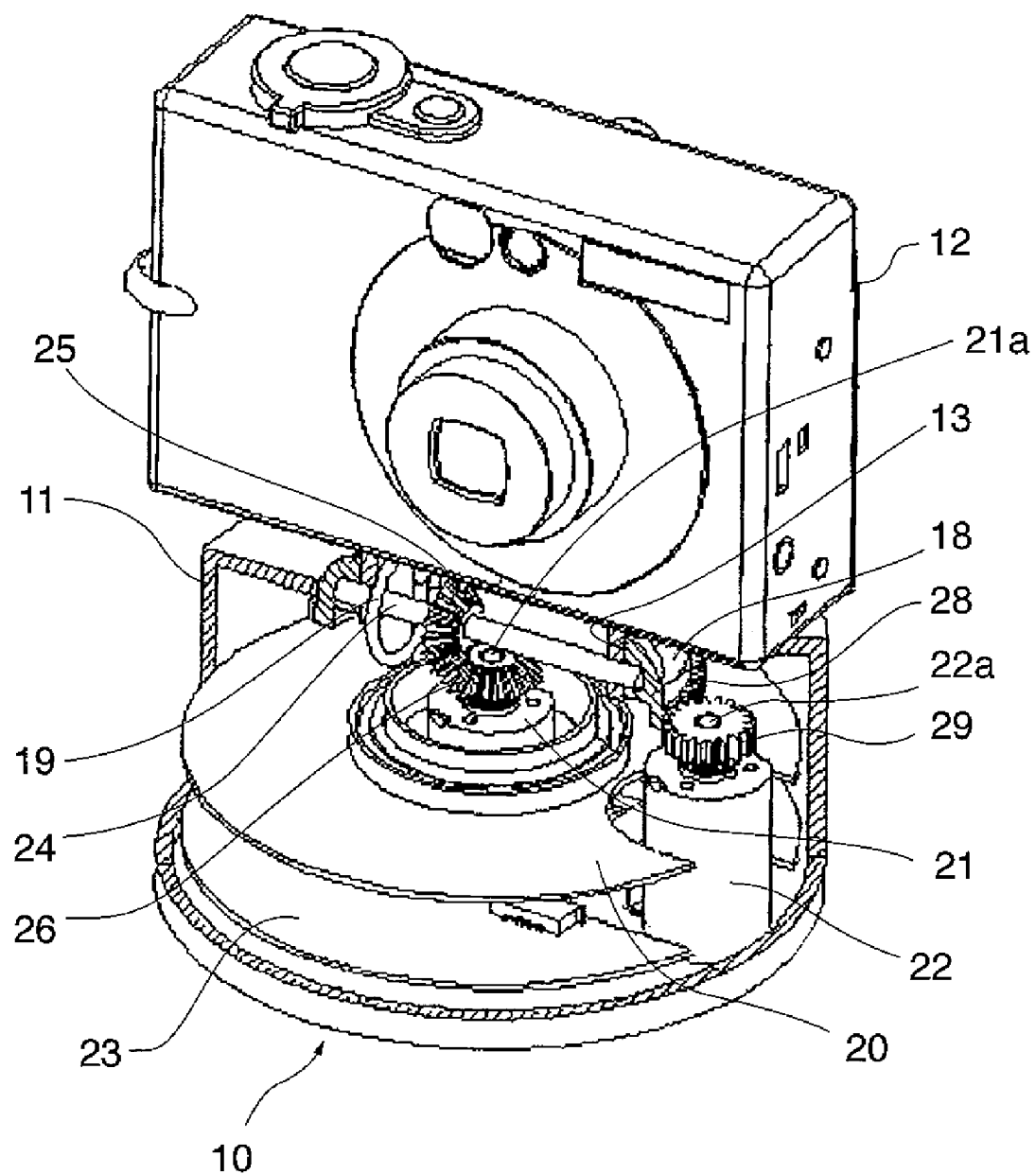
FIG. 2 is a partially cutaway perspective view showing an internal configuration of the cradle having a panhead function in FIG. 1, viewed slightly from the upper right.
Figure 3:
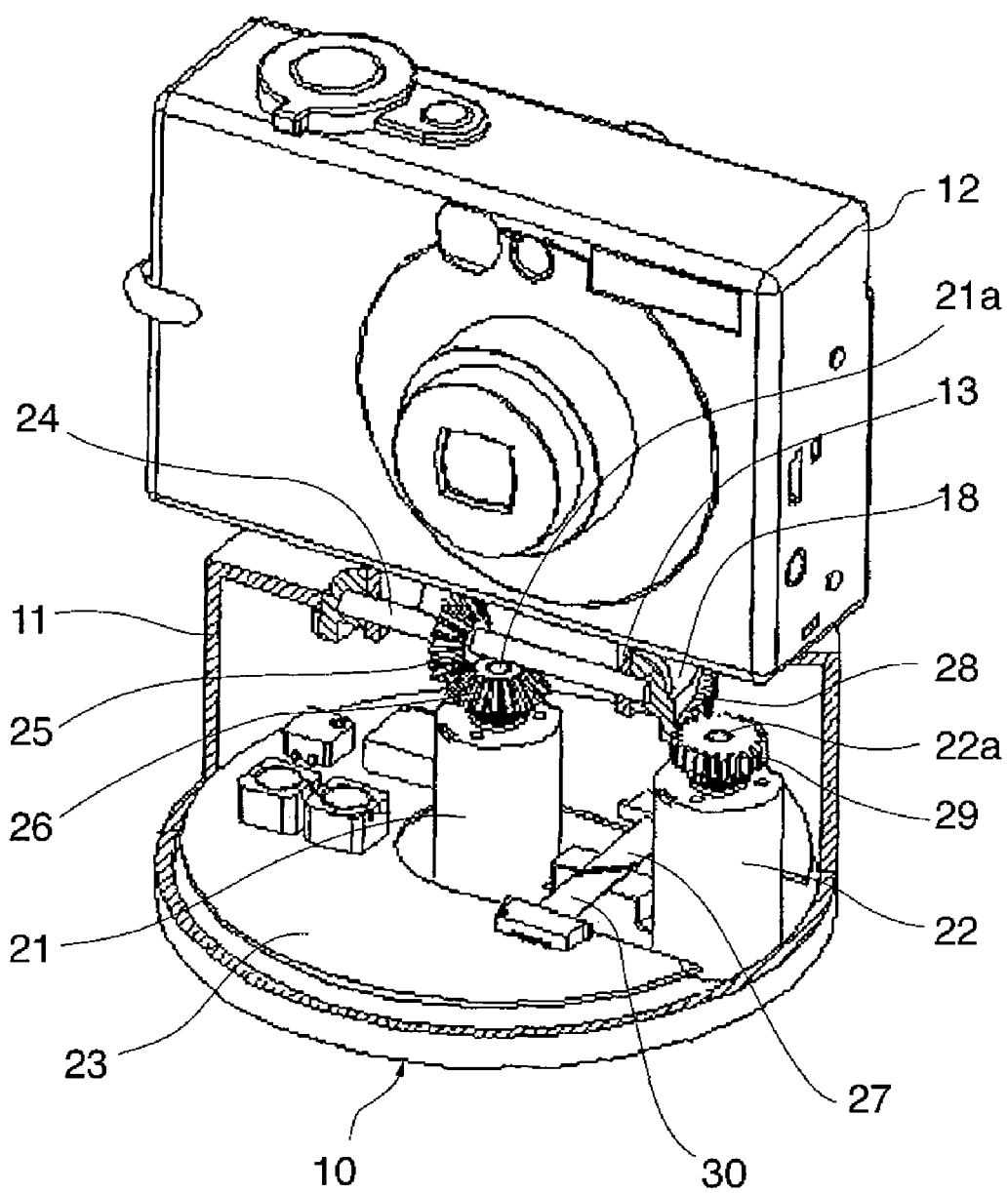
FIG. 3 is a partially cutaway perspective view showing an internal configuration of the cradle having a panhead function in FIG. 1, viewed slightly from the upper right.

FIGS. 2 and 3 are partially cutaway perspective views showing an internal configuration of the cradle 10 in FIG. 1, viewed slightly from the upper tight. FIG. 3 shows the internal configuration of the cradle 10 in FIG. 1, with a communication electric board 20 described later removed.

Hereinafter, the position of the cradle 10 and the digital camera 12 with the digital camera 12 mounted to the cradle 10 directed to the front (the state in FIGS. 2 and 3) is referred to as an "initial position". With respect to the pan direction-wise rotation (rotation around the vertical axis), the clockwise rotation is referred to as a "forward rotation" and the counterclockwise rotation is referred to as a "reverse rotation" on plan view. For a tilt direction-wise rotation (rotation around the horizontal direction), such a rotational direction as that a front surface of the digital camera 12 moves upward or downward from the initial position is referred to as an "upward tilt rotation" or an "downward tilt rotation", respectively.

As shown in FIGS. 2 and 3, the communication electric board 20 and a driving electric board 23 are fixedly provided in the support base 11. As shown in FIG. 2, a communication cable 19 is connected to the connector 15 and internally wired. To the communication electric board 20, the digital camera 12 is electrically connected via the communication cable 19 and the connector 15. Thus, the cradle 10 can transmit and receive electronic data, such as a picked-up image, to and from the digital camera 12 and supply electric power to the digital camera 12. The communication cable 19 is covered with a cable guide (not shown) so as to prevent the entangling during the rotation of the tilt base 13 and the pan base 18.

If the digital camera 12 itself has a wireless function (for example, corresponds to a wireless SD card), the digital camera 12 can directly transmit and receive electronic data to and from a PC. When supply of electric power is not required (when the panning or the tilting is simply performed), the communication cable 19 and the communication electric board 20 may be omitted.

As shown in FIGS. 2 and 3, a tilt motor 21 and a pan motor 22 are provided in the support base 11. Conventionally, a tilt motor is generally mounted to a pan base. In the embodiment, however, both the tilt motor 21 and the pan motor 22 are secured to the support base 11 itself. Specifically, bodies of the tilt motor 21 and the pan motor 22 fixedly vertically stands on a bottom of the support base 11 through the driving electric board 23 and the communication electric board 20. Then, an output shaft 21a that outputs torque of the tilt motor 21a, and an output shaft 22a that outputs torque of the pan motor 22 extend upward, respectively.

The tilt motor 21 is placed on the center of the support base 11 on plan view, and the output shaft 21a is coaxial with a rotation axis of the pan base 18. The pan motor 22 is placed near a wall of the cylindrical support base 11. Both the motors are in parallel with each other. Thus, the output shaft 21$a$ and the output shaft 22$a$ are also in parallel with each other.

The tilt motor 21 functions as a drive portion that rotates the tilt base 13 in the tilt direction. The pan motor 22 functions as a drive portion that rotates the pan base 18 in the pan direction. The tilt motor 21 and the pan motor 22 are driven and controlled by the driving electric board 23. Ultrasonic wave motors (USM motors) are used as the tilt motor 21 and the pan motor 22. Thus, each of the tilt motor 21 and the pan motor 22 has a braking effect of being stopped for preventing its output shaft from being rotated by an external force when the output shaft is stopped, that is, a property of holding torque that is one of properties of the USM motors.

A tilt base shaft 24 around which the tilt base 13 is rotated is provided below the tilt base 13 in a direction connecting the two release buttons 17 (see FIG. 1) The tilt base shaft 24 is secured to the tilt base 13 in such a manner that a rotation axis of the tilt base shaft 24 is perpendicular to a rotation axis of the pan base 18 perpendicularly to the rotation axis of the pan base 18. Opposite ends of the tilt base shaft 24 are rotatably assembled to the pan base 18 by bearings. This allows the tilt base 13 to be rotatable integrally with the tilt base shaft 24 in the tilt direction with respect to the pan base 18. A tilt base bevel gear 25 is fitted to the tilt base shaft 24. The tilt base bevel gear 25 is secured to the tilt base shaft 24 and rotated integrally with the tilt base shaft 24.

On the output shaft 21$a$ of the tilt motor 21, a tilt motor bevel gear 26 is provided engaging the tilt base bevel gear 25. A driving force of the tilt motor 21 is transmitted to the tilt base shaft 24 by the engagement between the tilt motor bevel gear 26 and the tilt base bevel gear 25. Thus, forward and reverse rotations of the tilt motor 21 causes upward and downward tilt rotations of the tilt base 13.

On an outer periphery of the pan base 18, a pan base spur gear 28 is provided. The pan base spur gear 28 is formed integrally with the pan base 18, or separately formed and secured to the pan base 18, at least at part of the outer periphery of the pan base 18 on the side of the pan motor 22. The pan base spur gear 28 may be provided over the entire outer periphery of the pan base 18. On the output shaft 22$a$ of the pan motor 22, a pan motor spur gear 29 is fixedly provided engaging the pan base spur gear 28. The driving force of the pan motor 21 is transmitted to the pan base 18 by the engagement between the pan motor spur gear 29 and the pan base spur gear 28. Forward and reverse rotations of the pan motor 22 causes reverse and forward pan direction-wise rotations of the pan base 18.

In the initial position, the tilt base bevel gear 25 is placed to engage a portion of the tilt motor bevel gear 26 opposite to the pan motor 22.

As shown in FIG. 3, a tilt flexible cable 27 and a pan flexible cable 30 are provided between the tilt motor 21 and the pan motor 22. The tilt flexible cable 27 electrically connects the driving electric board 23 and the tilt motor 21. The pan flexible cable 30 electrically connects the driving electric board 23 and the pan motor 22.

In the embodiment, the driving electric board 23 and the tilt motor 21 are not relatively moved. The driving electric board 23 and the pan motor 22 are not relatively moved. Thus, the tilt flexible cable 27 and the pan flexible cable 30 are not bent after being wired. This eliminates the need for covering the cables with cable guides or the like, and thus the cables can be easily handled.

Figure 4:
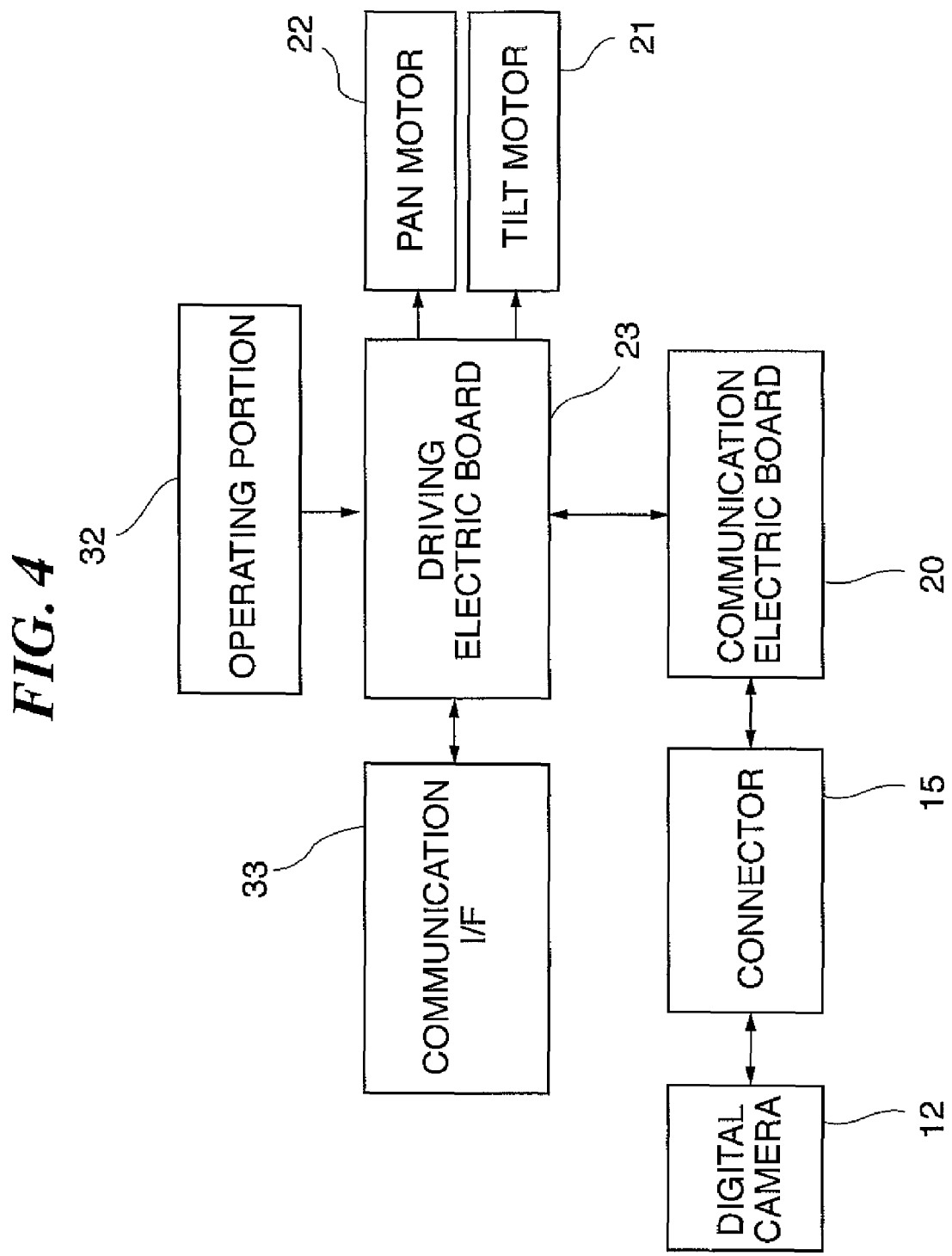
FIG. 4 is a block diagram of a configuration of the cradle having a panhead function in FIG. 1.

FIG. 4 is a block diagram of a configuration of the cradle 10 to which the digital camera 12 is mounted. As described above, the tilt motor 21 and the pan motor 22 are connected to the driving electric board 23 by the tilt flexible cable 27 and the pan flexible cable 30 (see FIG. 3). The digital camera 12 is connected to the communication electric board 20 via the communication cable 19 (see FIG. 2) and the connector 15. The driving electric board 23 and the communication electric board 20 are connected, and an operating portion 32 and a communication interface (I/F) 33 are further connected to the driving electric board 23.

The operating portion 32 has, for example, a pan instruction operating portion for instructing to perform a pan rotation, a tilt instruction operating portion for instructing to perform a tilt operation, and a home position instruction operating portion for instructing to return to the initial position (all not shown). The driving electric board 23 simultaneously drives and controls the tilt motor 21 and the pan motor 22 based on the instructions from the operating portion 32.

The communication I/F 33 performs data communication with an external device, and may be wired or wireless. The pan, tilt, and home position instructions may be received via the communication I/F 33. Instructions for target pan and tilt positions may be performed by indicating positions relative to the current position or the initial position.

Figure 5:
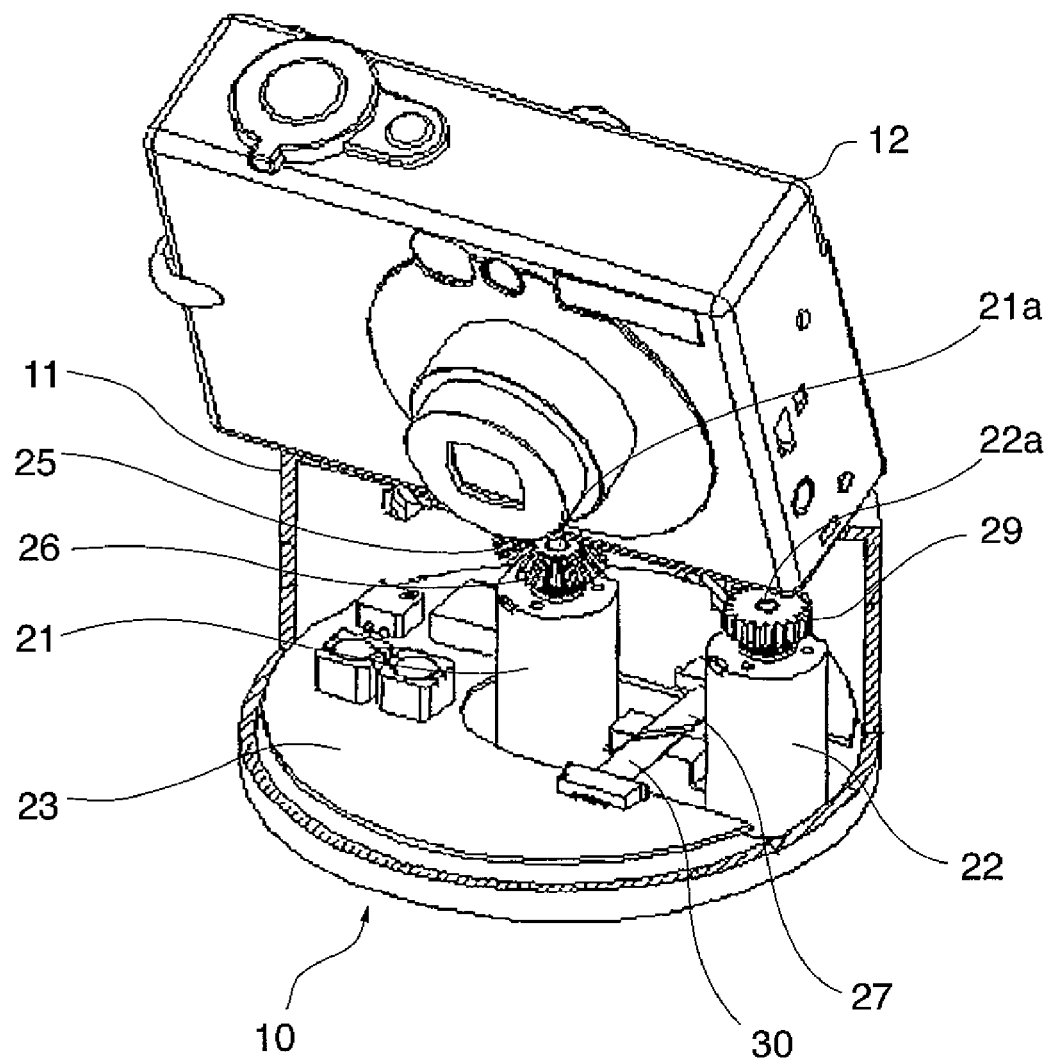
FIG. 5 is a partially cutaway perspective view of the digital camera and the cradle having a panhead function in FIG. 1.
Figure 6:
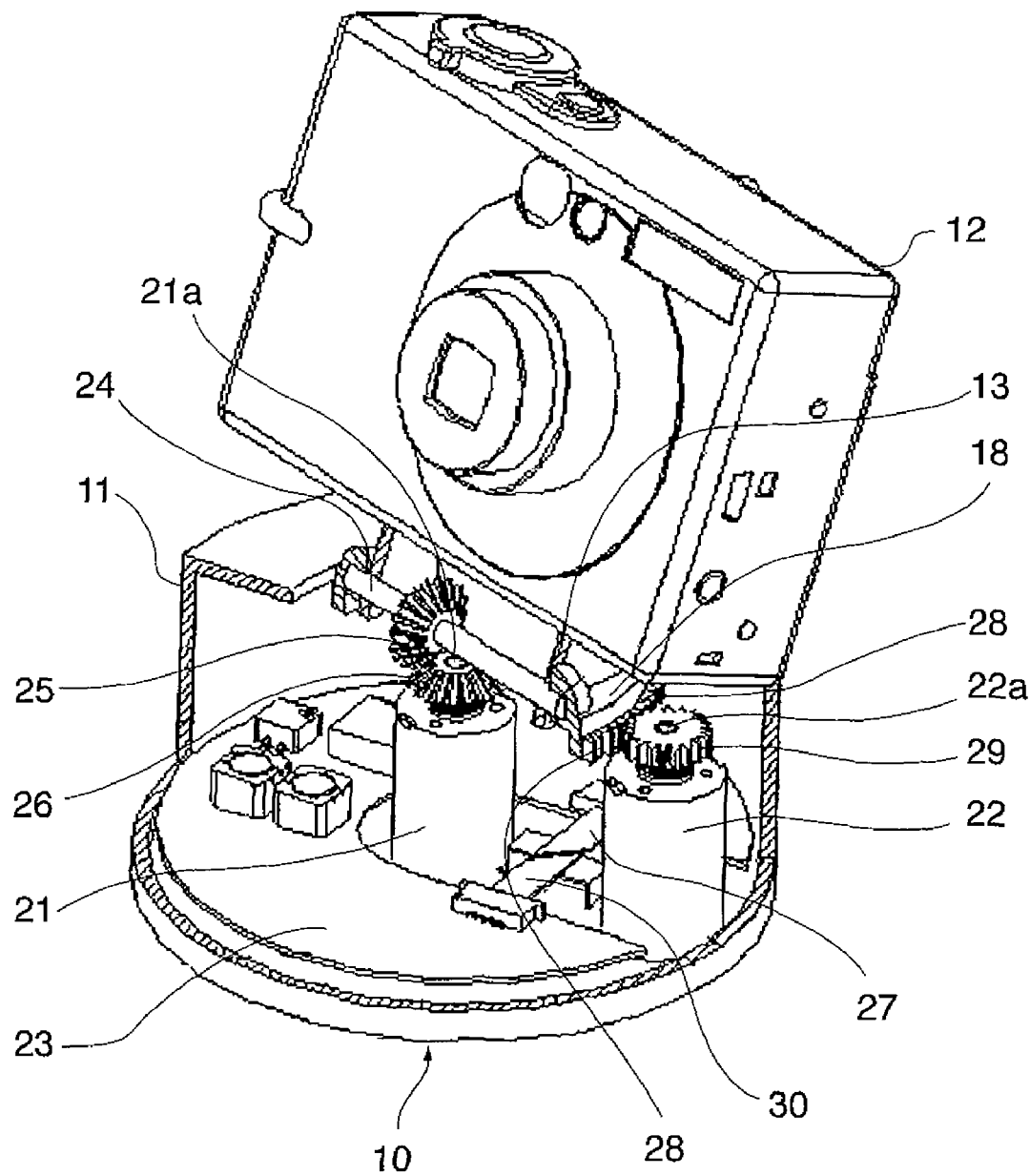
FIG. 6 is a partially cutaway perspective view of the digital camera and the cradle having a panhead function in FIG. 1.
Figure 7:
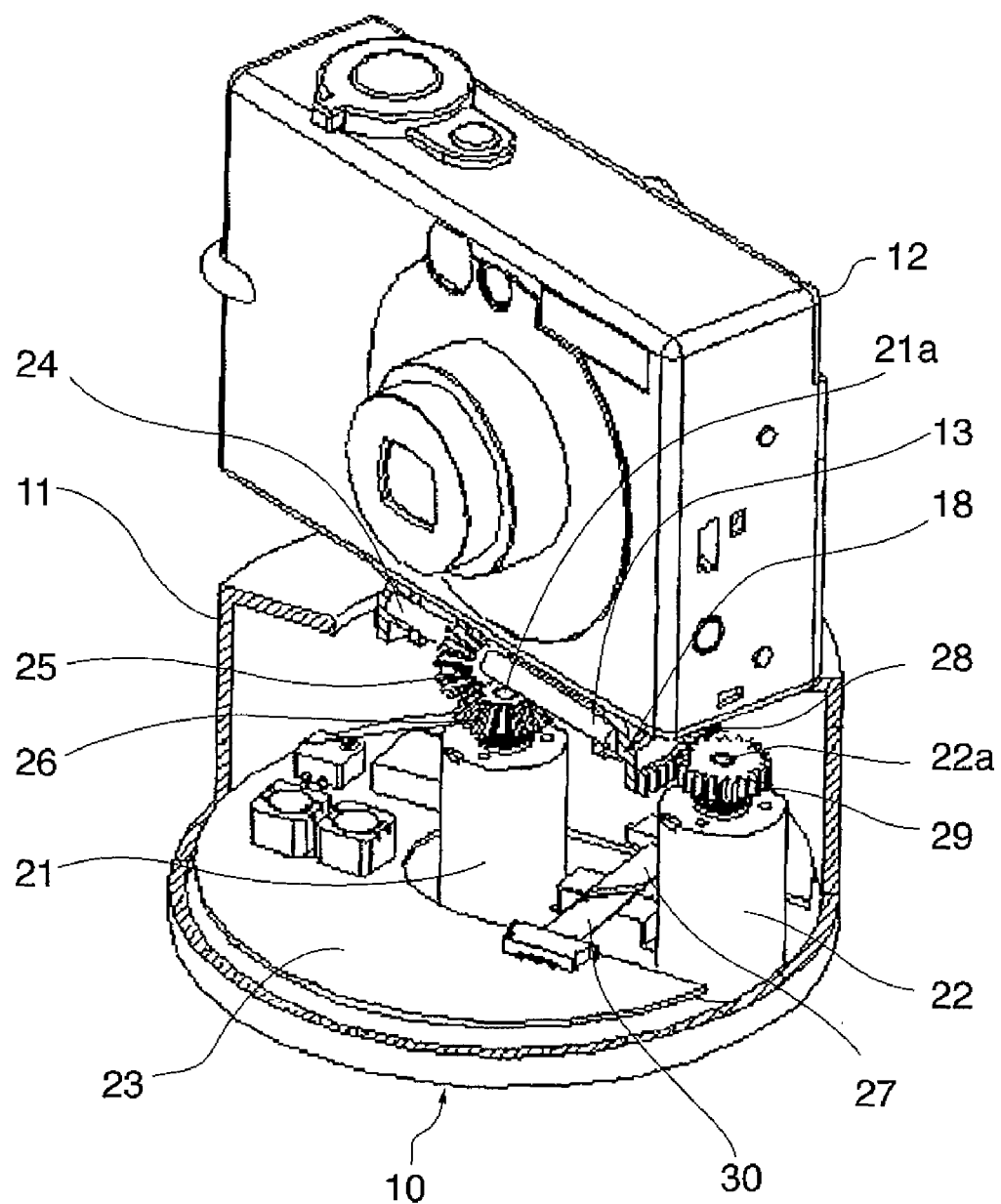
FIG. 7 is a partially cutaway perspective view of the digital camera and the cradle having a panhead function in FIG. 1.

FIGS. 5 to 7 are perspective views showing the operation of the cradle 10 to which the digital camera 12 is mounted. These figures are viewed slightly from the upper right like FIG. 1. For the sake of clarity, the communication electric board 20 or the like is not shown as in FIG. 3.

First, with reference to FIG. 5, forward rotary drive of the tilt motor 21 only from the initial position will be considered. When the tilt motor bevel gear 26 is rotated forward together with the output shaft 21$a$ of the tilt motor 21, the tilt base bevel gear 25 engaging the tilt motor bevel gear 26 is rotated downward (counterclockwise viewed from the pan motor spur gear 29), and the tilt base shaft 24 is also rotated in the same direction. Then, the tilt base 13 is rotated together with the tilt base shaft 24 in the same direction, and the digital camera 12 is directed downward. This is a downward tilt. Contrary to this, a reverse rotation of only the tilt motor 21 causes an upward tilt.

When only the tilt motor 21 is operated, the pan motor 22 is stopped, and the output shaft 22$a$ is thus stopped without being rotated due to the braking effect. The pan base 18 is also stopped. Thus, only the operation of the tilt motor 21 allows the digital camera 12 to be rotated in the tilt direction only.

Next, with reference to FIG. 6, reverse rotary drive of only the pan motor 22 from the initial position will be considered. When the pan motor spur gear 29 is reversely rotated together with the output shaft 22$a$ of the pan motor 22, the pan base 18 is rotated forward via the pan base spur gear 28 engaging the pan motor spur gear 29. The tilt motor 21 is stopped, and the output shaft 21$a$ is stopped without being rotated due to the braking effect as described above.

When the pan base 18 is rotated forward with the output shaft 21$a$ being stopped, an engagement position between the tilt base bevel gear 25 and the tilt motor bevel gear 26 is moved in a forward rotation direction. Specifically, since the tilt motor bevel gear 26 is kept stopped without being rotated together with the tilt base bevel gear 25, the tilt base bevel gear 25 moves on teeth of the tilt motor bevel gear 26. Thus, the tilt base shaft 24 is rotated upward together with the tilt base bevel gear 25, and the tilt base 13 is tilted upward. Thus, the digital camera 12 is rotated clockwise and directed upward from the initial position. Specifically, the digital camera 12 is rotated in a combined direction of the pan direction and the tilt direction. Contrary to this, when only the pan motor 22 is rotated forward, the digital camera 12 is rotated counterclockwise and tilted downward.

A movable rotation range of the pan base 18 may be not limited but may be 360°. The tilt base bevel gear 25 and the tilt motor bevel gear 26 are at least configured to always engage each other in a movable rotation path of the pan base 18.

The pan motor spur gear 29 and the pan base spur gear 28 transmit output torque of the pan motor 22 to the pan base 18, and are referred to as a "first transmission device". A reduction gear ratio of the driving force of the pan motor 22 in the first transmission device is 5:1 for the sake of clarity.

The tilt base bevel gear 25 and the tilt motor bevel gear 26 transmit output torque of the tilt motor 21 to the tilt base 13, and are referred to as a "second transmission device". A reduction gear ratio of the driving force of the tilt motor 21 in the second transmission device is 1:1 of the sake of clarity.

In FIGS. 5 and 6, the simplest operation control has been described with any one of the motors being stopped. This control uses a property of an ultrasonic wave motor that when a motor is stopped, a brake is applied to a motor shaft, and the motor is not rotated together with rotary drive of the other motor. In the embodiment, however, the driving electric board 23 is responsible for drive and control of the tilt motor 21 and the pan motor 22, thereby attaining more proper operations as described below.

With reference to FIG. 7, control will be described when only the pan in the forward direction is performed from the initial position without the tilt.

In such control, first, the pan motor 22 is reversely rotated and the tilt motor 21 is simultaneously rotated forward in the initial position. Specifically, in consideration of the reduction gear ratios in the first and second transmission devices, the pan motor 22 is reversely rotated five turns, and the tilt motor 21 is rotated forward one turn.

When the operations of both the motor are synchronized, the tilt motor bevel gear 26 and the tilt base bevel gear 25 are together rotated forward around the central axis of the support base 11 in engagement with each other at the same portions. Specifically, the tilt motor 21 is rotated forward so as not to vertically rotate the tilt base 13 together with the rotation in the pan direction. In such control, the pan motor 22 has a central force and the tilt motor 21 has an adjustment and correction force. If the pan and the tilt to the position in FIG. 7 may be finally attained through any paths, either five turns of the reverse rotation of the pan motor 22 or one turn of the forward rotation of the tilt motor 21 may be performed earlier.

When the pan in the reverse rotation direction is performed without the tilt, the tilt motor 21 is reversely rotated simultaneously with the forward rotation of the pan motor 22 contrary to the above.

The rotation of the tilt motor 21 besides the rotation of the pan motor 22 is controlled to allow the digital camera 12 to be rotated in any combined direction, and a rotational speed can be adjusted. The pan and tilt mechanisms have the same advantage as in the case where a differential mechanism is provided in drive transmission portions of the pan motor 22 and the tilt motor 21. Specifically, one of the pan motor 22 and the tilt motor 21 outputting a rotary drive torque (load) required for the pan direction-wise rotation or a rotary drive torque (load) required for the tilt direction-wise rotation, whichever is greater, can use, as an assist power, a driving force of the other motor outputting a smaller rotary drive torque.

Further, as will be illustrated, even during the operations of the two motors, torque of each motor is controlled to attain optimum operations such as driving torque control in a combined rotation to a desired position.

Figure 8A:
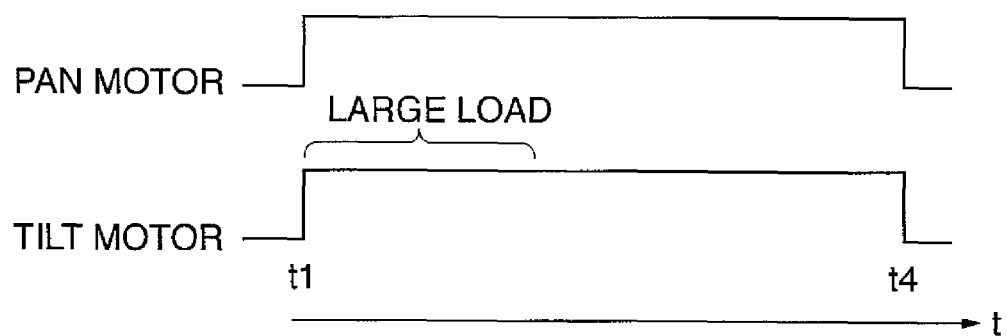
FIGS. 8A and 8B are timing charts showing driving patterns of a pan motor and a tilt motor in the cradle having a panhead function in FIG. 1.
Figure 8B:
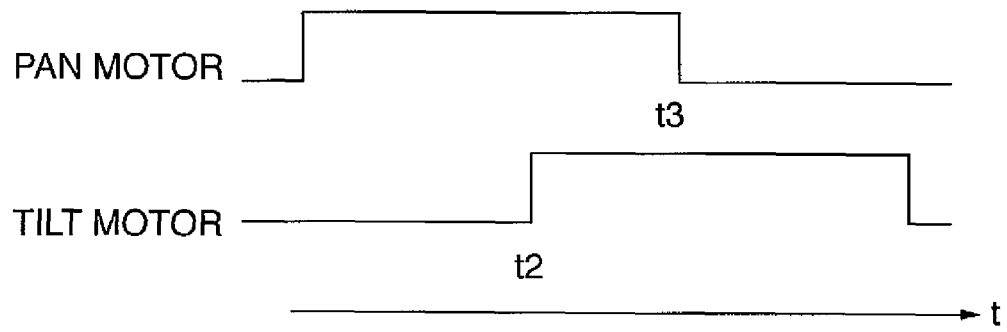

FIGS. 8A and 8B are timing charts showing driving patterns of the pan motor 22 and the tilt motor 21. Displacement of the digital camera 12 will be considered from the state where the digital camera 12 is directed downward to the right (hereinafter referred to as a "pre-driven state") to the state where the digital camera 12 is directed upward to the left (hereinafter referred to as a "driven state") as shown in FIG. 6. The reverse rotary drive of only the pan motor 22 causes an insufficient tilt, and the reverse rotary drive of the tilt motor 21 is also required for the displacement of the digital camera 12 from the pre-driven state to the driven state.

First, as shown in FIG. 8A, the pan motor 22 and the tilt motor 21 are simultaneously operated at time t1, and required turns of rotation are finished at time t4. In this case, since the center of gravity of the digital camera 12 is shifted backward with respect to the tilt base shaft 24, the loads (driving torque) of the pan motor 22 and the tilt motor 21 are also changed. Particularly, the digital camera 12 is first significantly directed downward, and the load of the tilt motor 21 is large and heavy in the first half. When the center of gravity of the digital camera 12 is tilted upward and then passes through immediately above the tilt base shaft 24, the load is gradually reduced.

The driving reduction gear ratios of the tilt motor 21 and the pan motor 22 are 1:1 and 5:1, and the pan motor 22 has more margin. Then, as shown in FIG. 8B, the tilt motor 21 is stopped from the time t1 to time t2 and only the pan motor 22 is reversely rotated. Thus, as described with reference to FIG. 6, the digital camera 12 is rotated clockwise and tilted upward according to the reduction gear ratios of the motors. This reduces the load on the tilt motor 21 in the early stages of driving.

Then, from the time t2, the reverse rotary drive of the tilt motor 21 is simultaneously performed. At time t3, the rotation of the pan motor 22 is finished. The level of the output torque of the pan motor 22 and the tilt motor 21 may not be constant, but may be changed successively. The reverse rotary drive of the pan motor 22 may be finished at the time t4 like the tilt motor 21. Thus, simultaneous control of the two motors allows drive control optimal to target displacement.

The control in FIG. 8B is taken as an example, and the driving electric board 23 performs control optimal to processes of the pan and the tilt. For example, the pan motor 22 and the tilt motor 21 are controlled so that the driving force of one of the pan motor 22 and the tilt motor 21 having a smaller load is used as an aid to the driving force of the other having a larger load for reducing the larger load. This prevents an imbalance between the loads of the two motors, thereby allowing quick and stable pan and tilt operations.

According to this embodiment, the pan base 18 is held by the support base 11 rotatably in the pan direction, and the tilt base 13 is held by the pan base 18 rotatably in the tilt direction. Then, the pan motor 22 and also the tilt motor 21 are secured to the support base 11 itself. This prevents the body of the tilt motor 21 from being rotated with the pan base 18, thereby eliminating the need for providing a space for avoiding interference between the tilt motor 21 and the tilt motor bevel gear 26. This eliminates the need for reducing the size of the reduction gear mechanism of the tilt or the pan, provides sufficient driving torque of each motor, and prevents a reduction in operation speeds of the pan and the tilt. This allows a reduction in space without a reduction in the operation speed. Further, the output shaft 21a of the tilt motor 21 and the output shaft 22a of the pan motor 22 are in parallel with each other, thereby further facilitating the reduction in space.

During the rotation of the pan base 18 in the pan direction, the tilt flexible cable 27 that is an electric harness of the tilt motor 21 is not entangled or bent by the operation, thereby eliminating the need for a special wiring technique and facilitating wiring.

The tilt motor 21 is not held by the pan base 18, thereby providing sufficient driving torque of the pan motor 22. It is understood that the pan rotation and the tilt rotation do not cause the pan flexible cable 30 that is an electric harness of the pan motor 22 to be entangled by the operation and to be broken due to bending.

In the embodiment, the driving electric board 23 simultaneously drives and controls the pan motor 22 and the tilt motor 21 for the pan direction-wise rotation and the tilt direction-wise rotation operation to the target positions. This allows the digital camera 12 to be automatically quickly displaced in a desired direction without requiring separate pan and tilt manual operations One of the pan motor 22 and the tilt motor 21 outputting a smaller driving force can be used as an assist power to the other outputting a lager driving source so as to reduce a load of the other motor, and if one motor requires larger torque, the other motor can support one motor. This stabilizes operations of both the motors. Particularly, displacement in the combined direction is performed quickly. This allows the pan and tilt operations to be performed quickly and stably without an imbalance between the loads of the two motors.

The ultrasonic wave motors are used as the tilt motor 21 and the pan motor 22, and thus each of the motors is not influenced by a driving force of the other motor without a special brake mechanism. For eliminating the influence of the driving force without the ultrasonic wave motors, a brake mechanism may be provided for obtaining the above described braking effect.

For reducing space and facilitating electric wiring without a reduction in operation speed, the control of the tilt motor 21 and the pan motor 22 with the driving electric board 23 is not essential. For example, the pan motor 22 may be rotated by a manual pan operation, and the tilt motor 21 may be rotated by a manual tilt operation.

To the tilt base 13, devices other than the digital camera 12 may be mounted such as a television, a sound collecting microphone, a spot light, or a fan, the direction of which is to be changed.

In the embodiment, the pan base 18 is held by the support base 11, and the tilt base 13 is held by the pan base 18. Contrary to this, the tilt base may be held by the support base 11, and the pan base may be held by the tilt base.

The tilt base shaft 24 is secured to the tilt base 13 and supported by the pan base 18, but not limited to this. Specifically, the tilt base shaft 24 itself may be fixedly placed relative to the pan base 18, and may be secured to the pan base 18 and prevented from rotation. In this case, the tilt base bevel gear 25 may be rotatably supported by the tilt base shaft 24, and the tilt base bevel gear 25 and the tilt base 13 may be fixedly connected via an interposing member. Then, the tilt base 13 may be rotated integrally with the tilt base bevel gear 25.

The tilt motor 21 may not be placed coaxially with the rotation axis of the pan base 18. Specifically, a bevel gear corresponding to the tilt motor bevel gear 26 may be provided so as to be rotated around the rotation axis of the pan base 18. In this case, a gear that transmits a driving force of the output shaft 21a of the tilt motor 21 to the bevel gear may be provided between the bevel gear and the output shaft 21a.

Figure 9:
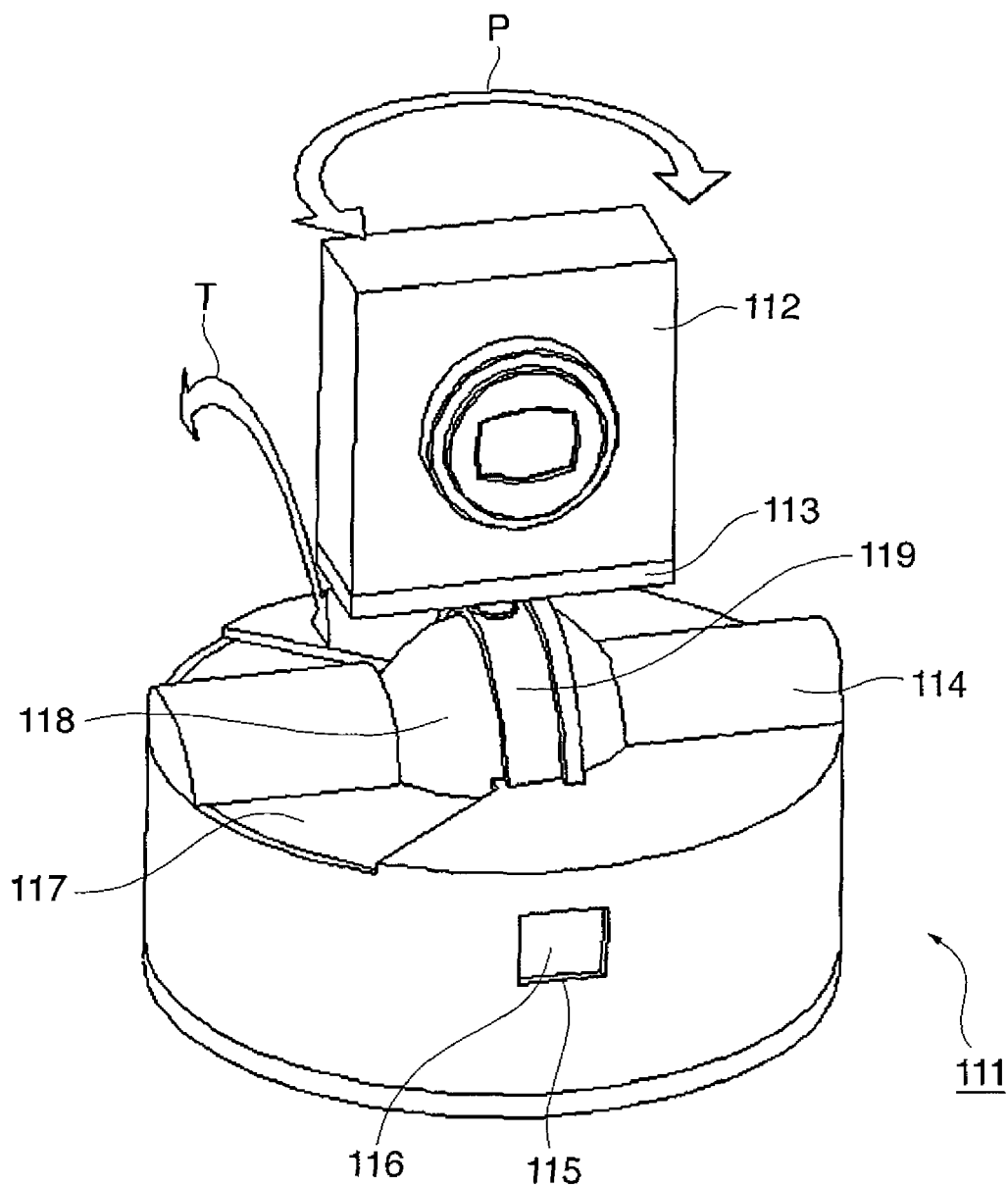
FIG. 9 is a perspective view of a cradle having a panhead function according to a second embodiment of the present invention, and a digital camera mounted to the cradle.
Figure 10:
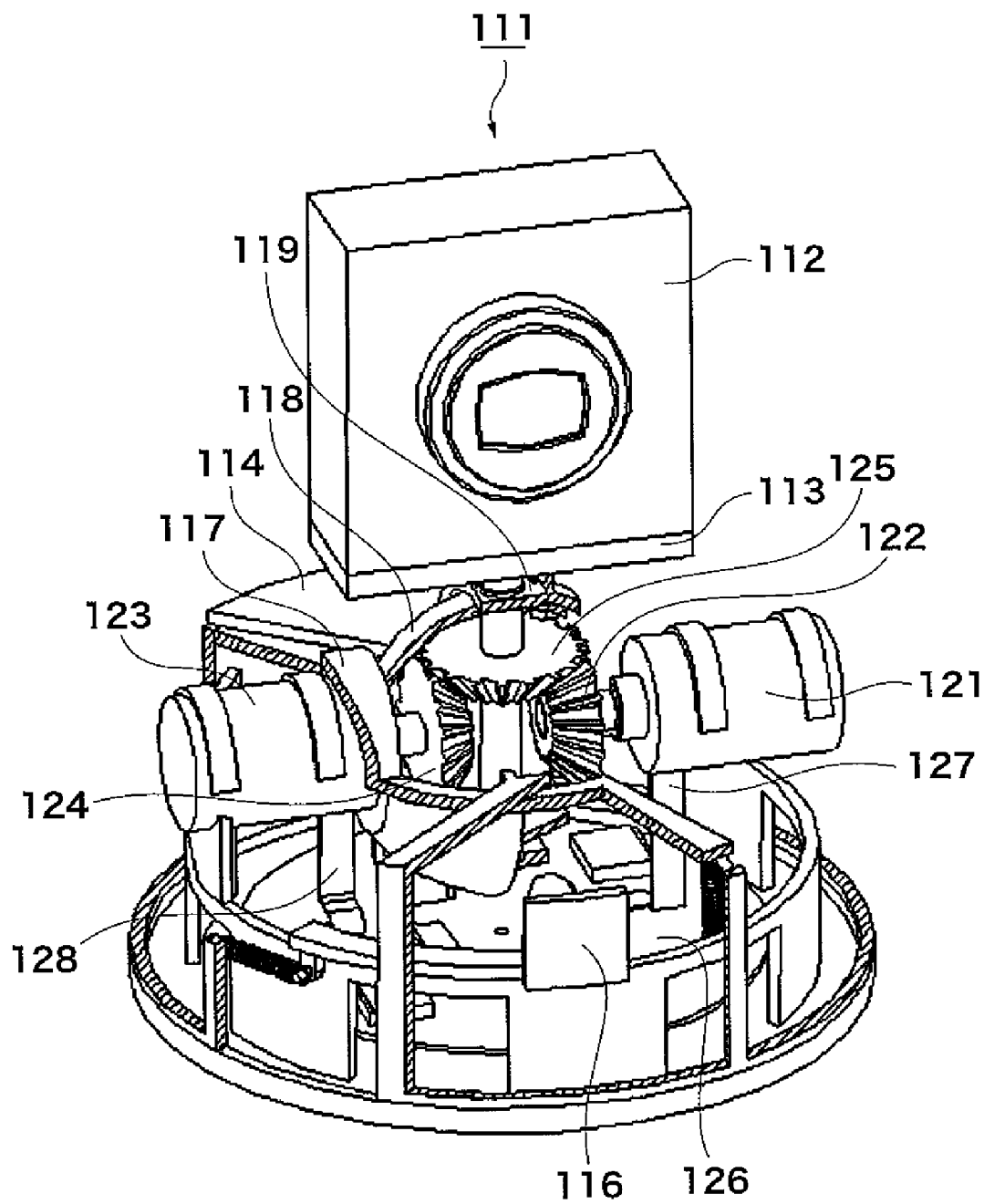
FIG. 10 is a partially cutaway perspective view of the cradle having a panhead function in FIG. 9.

FIG. 9 is a perspective view of a cradle having a panhead function according to a second embodiment of the present invention, and FIG. 10 is a partially cutaway perspective view of the cradle having a panhead function in FIG. 9.

As shown in FIG. 9, a cradle having a panhead function (hereinafter simply referred to as a "cradle") 111 includes a support base 113 that removably supports a digital camera 112 and rotates the digital camera 112 in a pan direction indicated by the arrow P and a tilt direction indicated by the arrow T. The cradle having a panhead function 111 is covered with a body cover member 114 as an outer cover, and movable cover members 117, 118 and 119.

In a front surface of the body cover member 114, a window 115 is provided, which is openable and closable by a shutter member 116. The movable cover member 117 has a substantially sector shape, the movable cover member 118 has a substantially spherical shape, and the movable cover member 119 has a substantially ring shape, which are all operated along with an operation of the support base 113 to which the digital camera is mounted.

Next, with reference to FIG. 10, an internal structure of the cradle having a panhead function 111 will be described.

In the cradle having a panhead function 111, a drive motor 121 and a drive motor 123 are placed as shown in FIG. 10.

The drive motor 121 is mounted to the body cover member 114, and a bevel gear 122 is provided on an output shaft of the drive motor 121. The drive motor 123 is mounted to the movable cover 117, and a bevel gear 124 is provided on an output shaft of the drive motor 123. A bevel gear 125 is provided on a rotation shaft of the support base 113.

In the embodiment, the bevel gears 122, 124 and 125 have the same shape and a gear ratio of 1:1 and are placed as described below for convenience in description, A rotation axis of the bevel gear 122 (an output shaft of the drive motor 121) and a rotation axis of the bevel gear 125 (a rotation shaft of the support base 113) are placed perpendicularly to each other, and the bevel gears 122 and 125 engage each other. A rotation axis of the bevel gear 124 (an output shaft of the drive motor 123) and a rotation axis of the bevel gear 125 (a rotation shaft of the support base 113) are placed perpendicularly to each other, and the bevel gears 124 and 125 engage each other. The rotation axis of the bevel gear 122 (the output shaft of the drive motor 121) and the rotation axis of the bevel gear 124 (the output shaft of the drive motor 123) are coaxial with each other.

The movable cover member 117 is provided rotatably around the rotation shaft of the support base 113 when vertically placed, and has mounting portions of the drive motors 121 and 123 and substantially sector-shaped blades placed on opposite sides of the portions. The blades overlap the body cover member 114.

The movable cover member 118 is provided rotatably around the output shaft of the output shaft 123 mounted to the movable cover member 117, and part of the substantially spherical portion overlaps the body cover member 114 and the movable cover member 119.

The movable cover member 119 rotatably holds the rotation shaft of the support base 113 and is provided rotatably around the output shaft of the drive motor 121, and part of the substantially ring-shaped portion overlaps the body cover member 114 and the movable cover member 118. Thus, the rotation shaft of the support base 113 is supported by the movable cover member 119 rotatably around the rotation axis of the output shaft of the drive motor 121 and around the rotation axis of the rotation shaft of the support base 113.

A main electric board 126 that controls an electric function is provided on a bottom of the cradle 111. The drive motor 121 and the main electric board 126 are electrically connected via a flexible cable 127, and the drive motor 123 and the main electric board 126 are electrically connected via a flexible cable 128.

Figure 11:
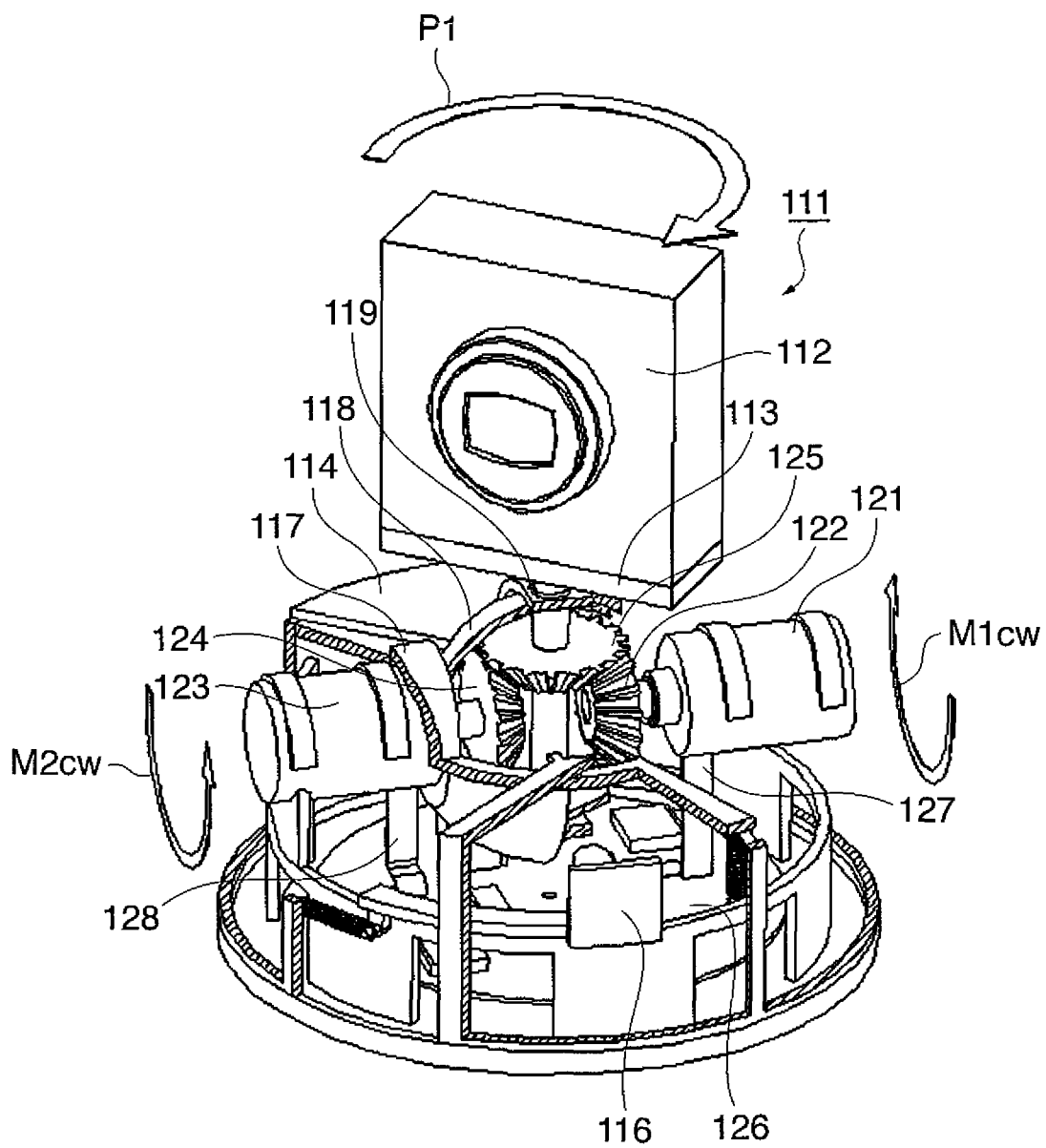
FIG. 11 is a perspective view which is useful in illustrating a pan direction-wise rotation operation of the cradle having a panhead function in FIG. 9.

Next, with reference to FIG. 11, a pan direction-wise rotation operation of the digital camera 112 will be described.

The output shaft of the drive motor 121 is rotated clockwise (in the direction of arrow M1cw) viewed from the output shaft, and the output shaft of the drive motor 123 is rotated clockwise (in the direction of arrow M2cw) viewed from the output shaft at the same speed as the drive motor 121. Then, the engagement between the bevel gear 122, the bevel gear 124 and the bevel gear 125 causes the support base 113 to which the digital camera 112 is mounted to be rotated in the pan direction (the direction of arrow P1) around the rotation shaft of the support base 113.

When the support base 113 to which the digital camera 112 is mounted is rotated in the pan direction opposite to the direction of arrow P1, the output shafts of the drive motors 121 and 123 may be rotated counterclockwise viewed from the output shafts at the same speed.

Next, with reference to FIG. 12, a tilt direction-wise rotation operation of the digital camera 112 will be described.

The output shaft of the drive motor 121 is rotated counterclockwise (in the direction of arrow M1ccw) viewed from the output shaft, and the output shaft of the drive motor 123 is rotated clockwise (in the direction of arrow M2ccw) viewed from the output shaft at the same speed as the drive motor 121. Then, the engagement between the bevel gear 122, the bevel gear 124 and the bevel gear 125 causes the support base 113 to which the digital camera is mounted to be rotated in the tilt direction (the direction of arrow T1) around the output shafts of the drive motors 121 and 123 placed coaxially with each other.

At this time, the movable cover member 118 and the movable cover member 119 are rotated around the output shafts of the drive motors 121 and 123 placed coaxially with each other along with the support base 113. In such a rotation, the overlapping portions of the movable cover member 118, the movable cover member 119 and the body cover member 114 prevent exposure of the internal structure of the cradle 111.

When the support base 113 to which the digital camera 112 is mounted is rotated in the tilt direction opposite to the direction of arrow T1, the drive motor 121 may be rotated clockwise viewed from the output shaft, and the drive motor 123 may be rotated counterclockwise viewed from the output shaft at the same speed as the drive motor 121.

Figure 13:
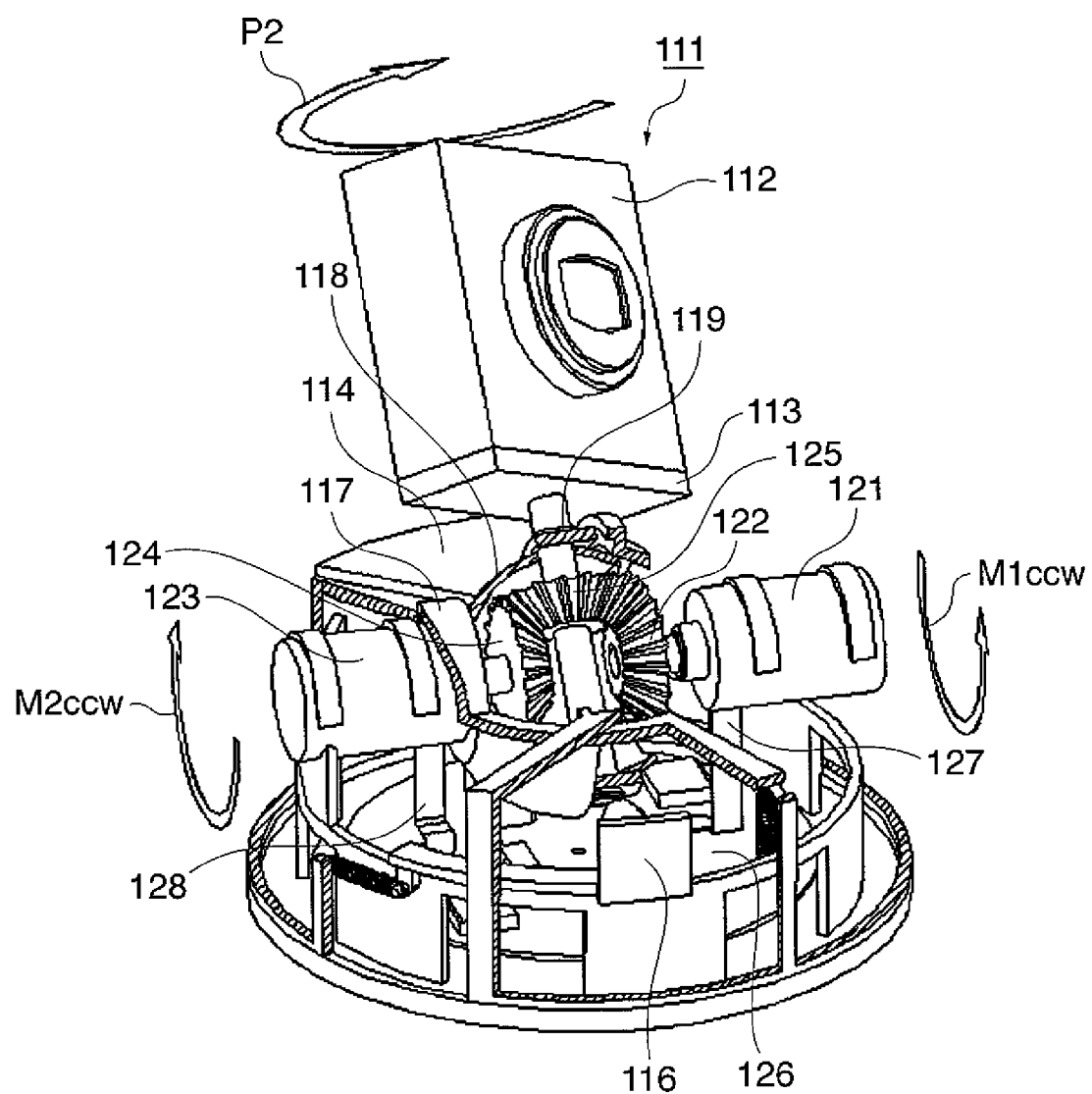
FIG. 13 is a perspective view which is useful in illustrating the pan direction-wise rotation operation and the tilt direction-wise rotation operation of the cradle having a panhead function in FIG. 9.

Next, with reference to FIG. 13, the tilt direction-wise and the pan direction direction-wise rotations of the digital camera 112 be described.

Figure 12:
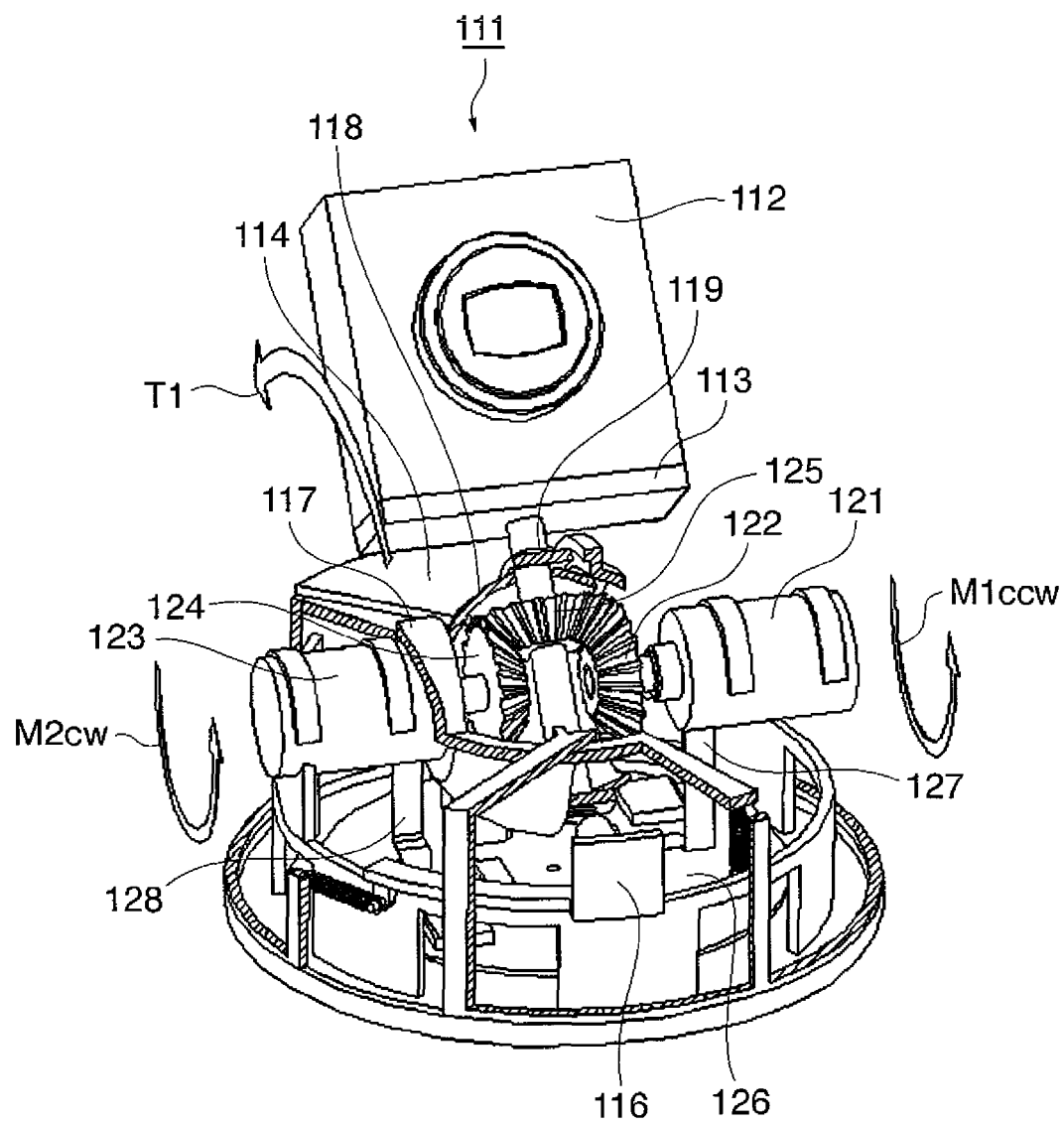
FIG. 12 is a perspective view which is useful in illustrating in a tilt direction-wise rotation operation of the cradle having a panhead function in FIG. 9.

After the tilt direction-wise rotation shown in FIG. 12, the drive motor 121 is rotated counterclockwise (in the direction of arrow M1ccw) viewed from the output shaft, and the drive motor 123 is rotated counterclockwise (in the direction of arrow M2ccw) viewed from the output shaft at the same speed as the drive motor 121. Then, the engagement between the bevel gear 122, the bevel gear 124 and the bevel gear 125 causes the support base 113 to which the digital camera is mounted to be rotated in the pan direction (the direction of arrow P2) around the rotation shaft of the support base 113 tilted in the tilt direction.

In this embodiment, the pan direction-wise rotation after the tilt direction-wise rotation has been described; however, the support base 113 to which the digital camera is mounted may be rotated in a combined direction of the tilt direction and the pan direction by a combination of the rotational directions of the drive motors 121 and 123.

The output shafts of the drive motors 121 and 123 are rotated at the same speed, the total torque of the two drive motors can be used with a simple mechanism, thereby facilitating control between the drive motors.

Further, in this embodiment, the bevel gears have the same shape and the gear ratio of 1:1, but even if the gear ratio is changed in view of the mass of the digital camera 112 or the like, the bevel gears 122 and 124 have the same shape, thereby obtaining the same advantage.

Next, with reference to FIG. 14, a function of the cradle having a panhead function 111 will be described other than the pan direction-wise rotation operation and the tilt direction-wise rotation operation of the digital camera 112 in.

Figure 14:
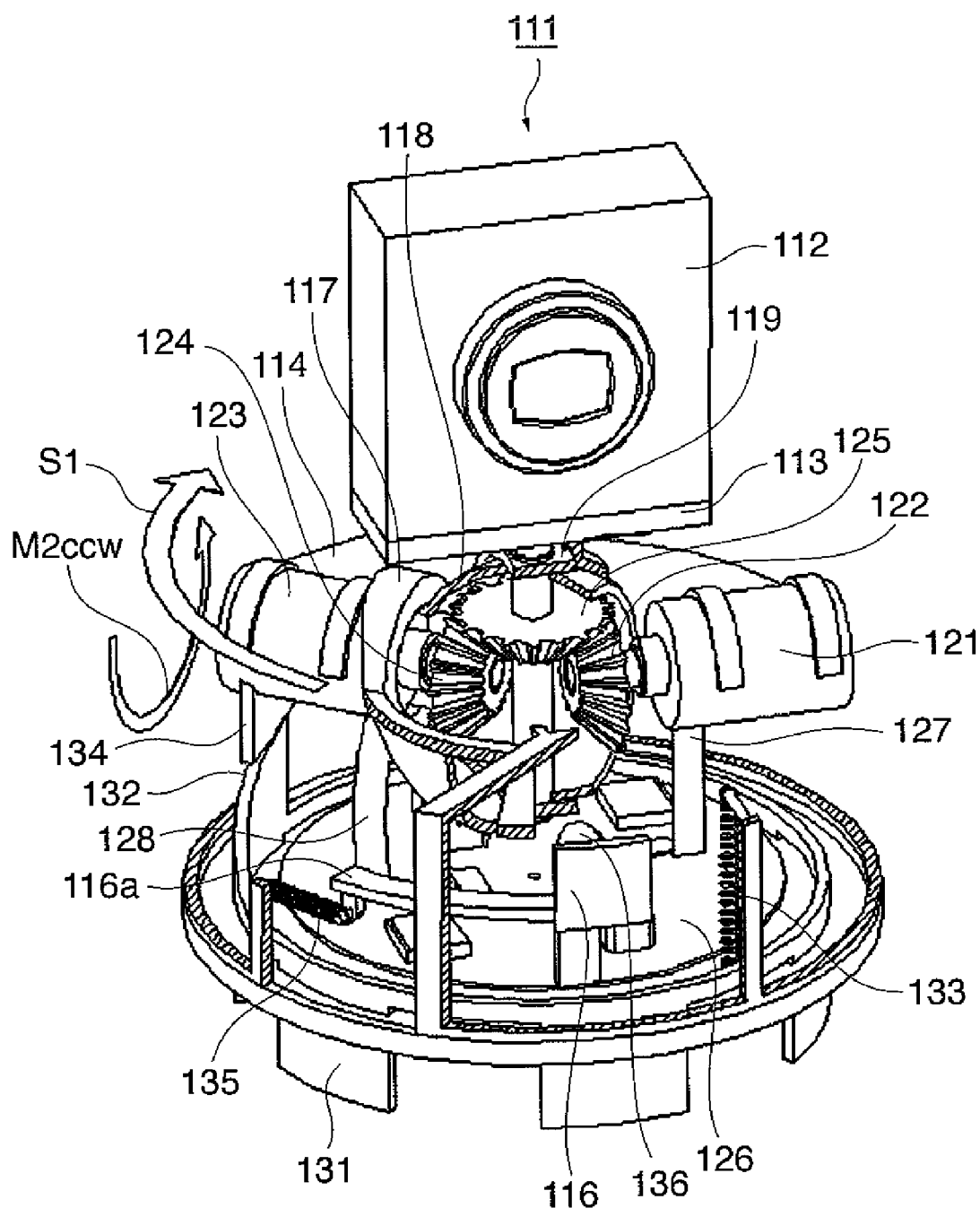
FIG. 14 is a perspective view which is useful in illustrating a function of the cradle having a panhead function in FIG. 9 other than the pan direction-wise rotation operation and the tilt direction-wise rotation operation.

As shown in FIG. 14, legs 131 are provided on the bottom of the cradle 111. Each of the legs 131 is vertically slidable to a protruding position and a drawn position with respect to the body cover member 114. An inclined cam 132 is formed on an upper portion of the leg 131. A lift leg returning spring 33 that urges the leg 31 to the drawn position is mounted to the inside of the body cover member 114. An engaging portion 134 that engages the cam 132 of the leg 131 is provided on the drive motor 123.

Then, the drive motor 121 is controlled to stop the rotation of the output shaft, and the drive motor 123 is rotated counterclockwise (in the direction of arrow M2ccw) viewed from the output shaft. When the drive motor 121 is an ultrasonic wave motor, the drive motor 121 has a holding force for holding the state of preventing the rotation of the output shaft during the stop (a deenergized holding force), and does not require a member for stopping the rotation of the output shaft.

The output shaft of the drive motor 121 is held in the stopped state, and thus the bevel gear 125 of the support base 113 engaging the bevel gear 122 of the drive motor 121 is not rotated and is stopped. Thus, the bevel gear 124 of the drive motor 123 travels by itself on tooth surfaces of the bevel gear 125, and the drive motor 123 itself pivots in the direction of arrow S1 around the rotation shaft of the support base 113 vertically standing.

During such a pivot, the movable cover member 117 also pivots integrally with the drive motor 123. The overlapping portions of the movable cover member 117 and the body cover member 114 prevent exposure of the internal structure of the cradle having a panhead function 111. The flexible cable 128 is long enough, and has no problem in electric connection.

Then, the pivot of the drive motor 123 in the direction of arrow S1 causes the engaging portion 134 to push down the cam 132 of the leg 131, and the leg 131 is moved to a position protruding downward beyond the bottom of the cradle 111. Thus, the cradle 111 is raised from the installation surface. This allows the digital camera 112 to perform image shooting in two vertical positions and to be used for triangulation, and the function other than the function of rotating the digital camera 112 in the pan direction and the tilt direction can be easily obtained without a special device.

When the drive motor 123 is rotated clockwise viewed from the output shaft to return the drive motor 123 to the position where the output shafts of the drive motors 121 and 123 are coaxial with each other, an urging force of the lift leg returning spring 133 causes the leg 131 to return to the drawn position.

Next, with reference to FIG. 15, the pan direction-wise rotation operation of the digital camera 112 in FIG. 14 will be described.

When the leg 31 in FIG. 14 is in the protruding position, the drive motor 121 is rotated clockwise (in the direction of arrow M1cw) viewed from the output shaft, and the drive motor 123 is rotated clockwise (in the direction of arrow M2cw) viewed from the output shaft at the same speed as the drive motor 121. Then, the engagement between the bevel gear 122, the bevel gear 124 and the bevel gear 125 causes the support base 113 to which the digital camera 112 is mounted to be rotated in the pan direction (the direction of arrow P1) around the rotation shaft of the support base 113.

Specifically, even if the output shafts of the drive motors 121 and 123 are not coaxial with each other, the digital camera can be rotated in the pan direction. Only when the drive motor 123 is returned to the position where the output shafts of both the drive motors 121 and 123 are placed coaxially with each other, the digital camera can be rotated in the tilt direction.

Next, with reference to FIG. 16, another function of the cradle 111 will be described other than the pan direction-wise rotation operation and the tilt direction-wise rotation operation of the digital camera 112.

Figure 16:
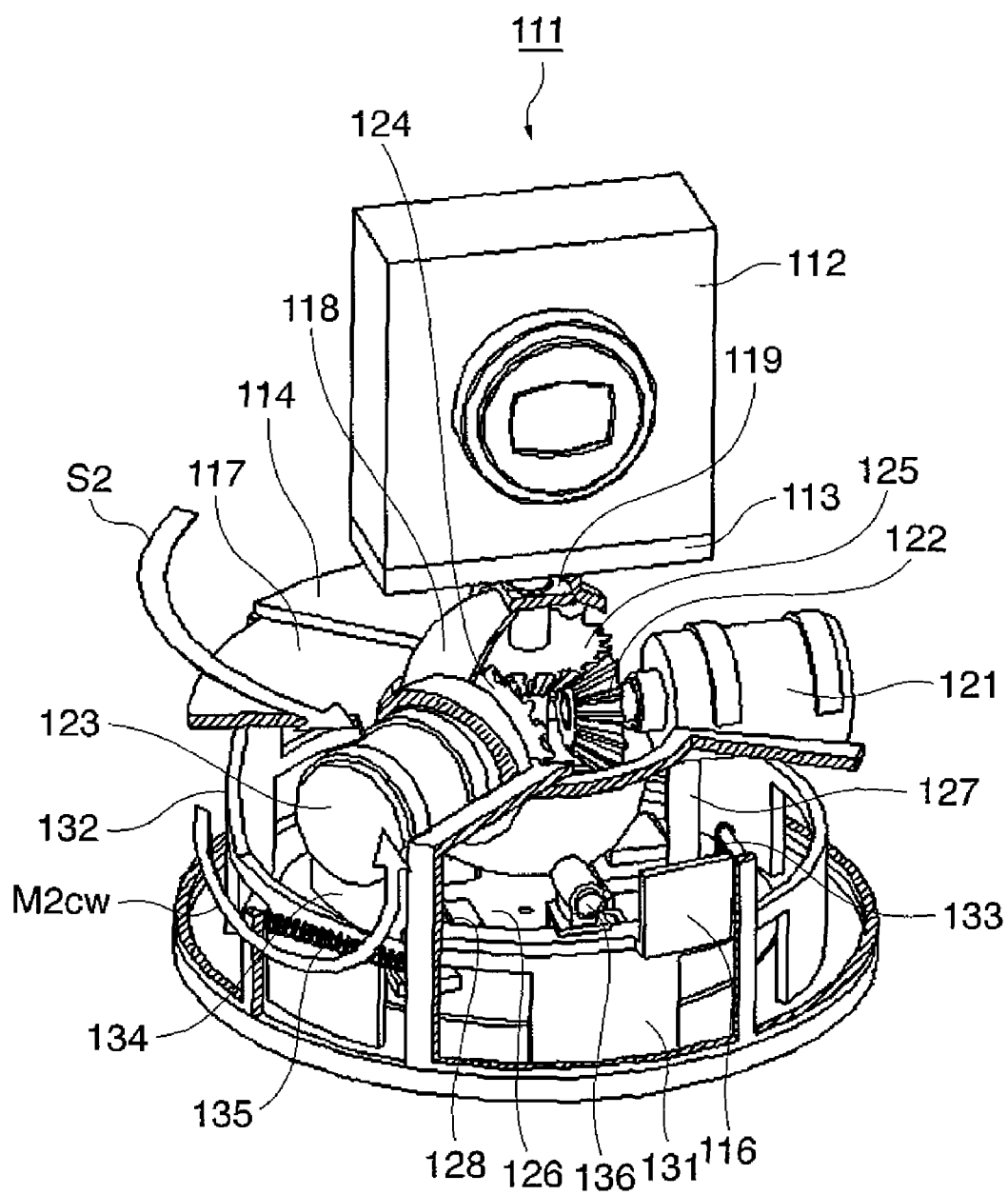
FIG. 16 is a perspective view which is useful in illustrating another function of the cradle having a panhead function in FIG. 9 other than the pan direction-wise rotation operation and the tilt direction-wise rotation operation.

As shown in FIG. 16, a shutter returning spring 135 that urges the shutter member 116 in a direction closing the window 115 (see FIG. 9) is mounted inside the body cover member 114. An access button 136 is placed behind the shutter member 116. The access button 136 is not accidentally operated when the window 115 is closed by the shutter member (in a normal state).

Then, the drive motor 121 is controlled to stop the rotation of the output shaft, and the drive motor 123 is rotated counterclockwise (in the direction of arrow M2cw) viewed from the output shaft. When the drive motor 121 is an ultrasonic wave motor, the drive motor 121 has a holding force for holding the state of preventing the rotation of the output shaft during the stop (a deenergized holding force), and does not require a member for stopping the rotation of the output shaft.

The output shaft of the drive motor 121 is held in the stopped state, and thus the bevel gear 125 of the support base 113 engaging the bevel gear 122 of the drive motor 121 is not rotated and is stopped. Thus, the bevel gear 124 of the drive motor 123 travels by itself on the tooth surfaces of the bevel gear 125, and the drive motor 123 itself pivots in the direction of arrow S2 around the rotation shaft of the support base 113 vertically standing.

The pivot of the drive motor 123 in the direction of arrow S2 causes the engaging portion 134 to press a rear end 116a (see FIG. 14) of the shutter member 116, which is moved to a position for opening the window 115. This allows the access button 136 to be operable from the outside of the cradle having a panhead function 111.

The access button 136 may have a function of, for example, a reset button of initial setting or a hidden command button. When the access button 136 is used as a button for attaching and removing the digital camera to and from the support base 113, operability can be improved because the access button 136 is placed in a position for preventing the tilt direction-wise rotation operation of the support base 113. Thus, the function other than the pan direction-wiser rotation operation and the tilt direction-wise rotation operation of the digital camera in can be easily obtained without a special device.

If the drive motor 123 is rotated counterclockwise viewed from the output shaft to return the drive motor 123 to the position where the output shafts of the drive motors 121 and 123 are coaxial with each other, an urging force of the shutter returning spring 135 causes the shutter member 116 to return to a position for closing the window 115.

Figure 15:
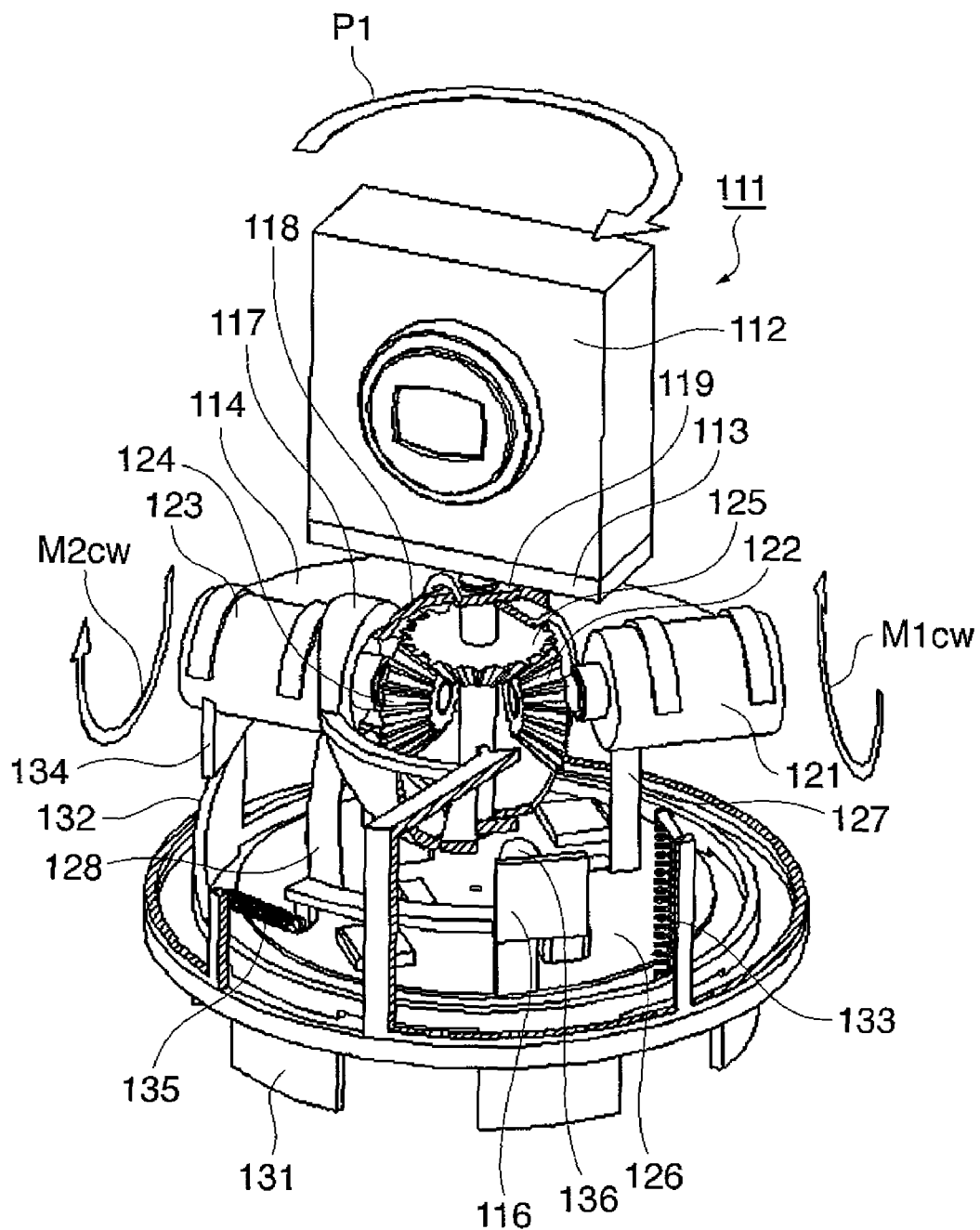
FIG. 15 is a perspective view which is useful in illustrating the pan direction-wise rotation operation of the cradle having a panhead function in FIG. 1 in the state shown in FIG. 14.

Then, as in FIG. 15, even if the output shafts of the drive motors 121 and 123 are not coaxial with each other, the digital camera can be rotated in the pan direction. Only when the drive motor 123 is returned to the position where the output shafts of both the drive motors 121 and 123 are placed coaxially with each other, the digital camera can be rotated in the tilt direction.

As described above, in the embodiment, the digital camera can be rotated in the pan direction and the tilt direction using the total torque of the two drive motors 121 and 123, thereby facilitating the control of the two drive motors 121 and 123.

During the rotation of the digital camera 112 in the pan direction, the two drive motors 121 and 123 are not rotated in the pan direction together with the digital camera, and during the tilt direction-wise rotation operation, rotation moment is generated on the digital camera only.

This allows a reduction in the sizes of the movable part of the digital camera and the two drive motors 121 and 123, facilitates wiring to the two drive motors 121 and 123, and attains an increase in speed of the rotation in the pan direction and the tilt direction.

In the second embodiment, the output shaft of the drive motor 121 is stopped, and the output shaft of the drive motor 123 is rotated to pivot the drive motor 123. However, predetermined rotation control of both the drive motors 121 and 123 may be performed for the same pivot.

While the present invention has been described with reference to exemplary embodiments, it is to be understood that the invention is not limited to the disclosed the embodiments. The scope of the following claims is to be accorded the broadest interpretation so as to encompass all such modifications and equivalent structures and functions.

This application claims the benefits of Japanese Patent Application No. 2006-091378, filed Mar. 29, 2006, and Japanese Patent Application No. 2006-254472, filed Sep. 20, 2006 which are hereby incorporated by reference herein in its entirety.

What is claimed is:

1. A cradle having a panhead function to which an image pickup device is mounted and adapted to rotate said image pickup device in a pan direction or a tilt direction, comprising:
   a support base;
   a first base supported on said support base rotatably around a first rotation axis line secured relatively to said support base;
   a second base supported by said first base rotatably around a second rotation axis line perpendicular to said first rotation axis line and secured relatively to said first base, and adapted to support said image pickup device;
   a pan motor disposed on said support base and adapted to rotatably drive said first base via a first transmission portion;
   a tilt motor disposed on said support base and adapted to rotatably drive said second base via a second transmission portion; and
   a drive control portion configured to control said tilt motor to rotate reversely in synchronization with said pan motor during only a pan direction-wise rotation operation of said image pickup device.

2. A cradle having a panhead function according to claim 1, wherein said second transmission portion includes a first bevel gear disposed on said second base rotatably around said first rotation axis line, and a second bevel gear disposed on said tilt motor rotatably around said second rotation axis line, and said first bevel gear and said second bevel gear engage each other.

3. A cradle having a panhead function according to claim 1, wherein said drive control portion controls said pan motor and said tilt motor so that one of said pan motor and said tilt motor outputting a smaller driving force is used as an assist power to a driving force of the other outputting a larger driving force.

4. A cradle having a panhead function according to claim 1, wherein at least one of said pan motor and said tilt motor is constituted by an ultrasonic wave motor.

5. A cradle having a panhead function according to claim 1, wherein an output shaft of said pan motor and an output shaft of said tilt motor are arranged in parallel with each other.

6. A cradle having a panhead function according to claim 2, wherein, when said pan is rotated to a desired position without tilting of said first base, said drive control portion controls said pan motor to rotate said first base to said desired position, and controls said tilt motor to rotate said second base necessary to compensate tilting movement of said second base by rotation of said first base.

* * * * *